(12) United States Patent
Ell

(10) Patent No.: US 12,043,905 B2
(45) Date of Patent: Jul. 23, 2024

(54) ELECTRODE WATERING ASSEMBLIES AND METHODS FOR MAINTAINING CATHODIC MONITORING OF STRUCTURES

(71) Applicant: MARATHON PETROLEUM COMPANY LP, Findlay, OH (US)

(72) Inventor: Ryan Grant Ell, Findlay, OH (US)

(73) Assignee: MARATHON PETROLEUM COMPANY LP, Findlay, OH (US)

( * ) Notice: Subject to any disclaimer, the term of this patent is extended or adjusted under 35 U.S.C. 154(b) by 0 days.

(21) Appl. No.: 18/232,871

(22) Filed: Aug. 11, 2023

(65) Prior Publication Data

US 2023/0383418 A1    Nov. 30, 2023

Related U.S. Application Data

(60) Continuation-in-part of application No. 17/886,178, filed on Aug. 11, 2022, now Pat. No. 11,807,945, (Continued)

(51) Int. Cl.
*C23F 13/22*    (2006.01)
*C23F 13/06*    (2006.01)
*G01N 17/04*    (2006.01)

(52) U.S. Cl.
CPC .............. *C23F 13/22* (2013.01); *C23F 13/06* (2013.01); *G01N 17/046* (2013.01)

(58) Field of Classification Search
CPC ........ C23F 13/06; C23F 13/22; G01N 17/046
See application file for complete search history.

(56) References Cited

U.S. PATENT DOCUMENTS 2,626,627 A    1/1953    Jung et al.
2,864,252 A    12/1958    Schaschl
(Continued)

FOREIGN PATENT DOCUMENTS

AU    2010241217    11/2010
AU    2013202839    5/2014
(Continued)

OTHER PUBLICATIONS

Neutrik XXR-2 XX Series, https://www.parts-express.com/Neutrik-XXR-2-XX-Series-Color-Coding_Ring-Red, 2022.
(Continued)

*Primary Examiner* — Jeff W Natalini
(74) *Attorney, Agent, or Firm* — Womble Bond Dickinson (US) LLP

(57) ABSTRACT

Assemblies and methods for maintaining cathodic monitoring of underground structures may include an electrode watering assembly having a cap that includes a cap body of a rigid material defining one or more chambers adjacent to a proximal electrode end of a permanent reference electrode when installed thereon. The cap body may include a distal cap end defining a distal opening configured to be disposed around the proximal electrode end and a proximal cap end defining a proximal opening. The electrode watering assembly may include a conduit having a flexible material. The conduit may include a distal conduit end configured to be fluidly coupled to the proximal opening and a proximal conduit end configured to be positioned at a cathodic test station, such that fluid directed into the proximal conduit end is directed through the conduit and into the one or more chambers for watering at least the proximal electrode end.

23 Claims, 13 Drawing Sheets

Related U.S. Application Data which is a division of application No. 17/805,801, filed on Jun. 7, 2022, now Pat. No. 11,447,877.

(60) Provisional application No. 63/513,391, filed on Jul. 13, 2023, provisional application No. 63/466,056, filed on May 12, 2023, provisional application No. 63/466,062, filed on May 12, 2023, provisional application No. 63/365,102, filed on May 20, 2022, provisional application No. 63/260,622, filed on Aug. 26, 2021.

(56) References Cited

U.S. PATENT DOCUMENTS

| | | |
|---|---|---|
| 3,087,311 A | 4/1963 | Rousseau |
| 3,303,525 A | 2/1967 | Peoples |
| 3,398,071 A | 8/1968 | Bagno |
| 3,504,686 A | 4/1970 | Cooper et al. |
| 3,593,555 A | 7/1971 | Grosko |
| 3,608,869 A | 9/1971 | Woodle |
| 3,672,180 A | 6/1972 | Davis |
| 3,725,669 A * | 4/1973 | Tatum .................. C23F 13/06 174/6 |
| 3,807,433 A | 4/1974 | Byrd |
| 3,809,113 A | 5/1974 | Grove |
| 3,925,592 A | 12/1975 | Webb |
| 3,961,493 A | 6/1976 | Nolan, Jr. |
| 4,010,779 A | 3/1977 | Pollock et al. |
| 4,073,303 A | 2/1978 | Foley, Jr. |
| 4,109,677 A | 8/1978 | Burnside |
| 4,202,351 A | 5/1980 | Biche |
| 4,229,064 A | 10/1980 | Vetter et al. |
| 4,242,533 A | 12/1980 | Cott |
| 4,289,163 A | 9/1981 | Pierson |
| 4,294,378 A | 10/1981 | Rabinovich |
| 4,320,775 A | 3/1982 | Stirling et al. |
| 4,357,576 A | 11/1982 | Hickam et al. |
| 4,420,008 A | 12/1983 | Shu |
| 4,457,037 A | 7/1984 | Rylander |
| 4,481,474 A | 11/1984 | Gerrit |
| 4,488,570 A | 12/1984 | Jiskoot |
| 4,630,685 A | 12/1986 | Huck et al. |
| 4,690,587 A | 9/1987 | Petter |
| 4,744,305 A | 5/1988 | Lim et al. |
| 4,788,093 A | 11/1988 | Murata et al. |
| 4,794,331 A | 12/1988 | Schweitzer, Jr. |
| 4,848,082 A | 7/1989 | Takahashi |
| 4,897,226 A | 1/1990 | Hoyle et al. |
| 4,904,932 A | 2/1990 | Schweitzer, Jr. |
| 4,964,732 A | 10/1990 | Cadeo et al. |
| 5,050,064 A | 9/1991 | Mayhew |
| 5,095,977 A | 3/1992 | Ford |
| 5,129,432 A | 7/1992 | Dugger |
| 5,191,537 A | 3/1993 | Edge |
| 5,367,882 A | 11/1994 | Lievens et al. |
| 5,383,243 A * | 1/1995 | Thacker ................ B08B 9/0436 15/104.18 |
| 5,469,830 A | 11/1995 | Gonzalez |
| 5,533,912 A | 7/1996 | Fillinger |
| 5,562,133 A | 10/1996 | Mitchell |
| 5,595,709 A | 1/1997 | Klemp |
| 5,603,360 A | 2/1997 | Teel |
| 5,627,749 A | 5/1997 | Waterman et al. |
| 5,661,623 A | 8/1997 | McDonald |
| 5,783,916 A | 7/1998 | Blackburn |
| 5,814,982 A | 9/1998 | Thompson et al. |
| 5,832,967 A | 11/1998 | Andersson |
| 5,873,916 A | 2/1999 | Cemenska et al. |
| 5,895,347 A | 4/1999 | Doyle |
| 5,906,648 A | 5/1999 | Zoratti et al. |
| 5,906,877 A | 5/1999 | Popper et al. |
| 5,939,166 A | 8/1999 | Cheng et al. |
| 5,962,774 A | 10/1999 | Mowry |
| 5,973,593 A | 10/1999 | Botella |
| 5,993,054 A | 11/1999 | Tan et al. |
| 6,022,421 A | 2/2000 | Bath |
| 6,050,844 A | 4/2000 | Johnson |
| 6,065,903 A | 5/2000 | Doyle |
| 6,077,340 A | 6/2000 | Doyle |
| 6,077,418 A | 6/2000 | Iseri et al. |
| 6,098,601 A | 8/2000 | Reddy |
| 6,111,021 A | 8/2000 | Nakahama et al. |
| 6,149,351 A | 11/2000 | Doyle |
| 6,186,193 B1 | 2/2001 | Phallen et al. |
| 6,243,483 B1 | 6/2001 | Petrou et al. |
| 6,333,374 B1 | 12/2001 | Chen |
| 6,346,813 B1 | 2/2002 | Kleinberg |
| 6,383,237 B1 | 5/2002 | Anger et al. |
| 6,427,384 B1 | 8/2002 | Davis, Jr. |
| 6,478,353 B1 | 11/2002 | Barrozo |
| 6,679,302 B1 | 1/2004 | Mattingly et al. |
| 6,719,921 B2 | 4/2004 | Steinberger et al. |
| 6,799,883 B1 | 10/2004 | Urquhart et al. |
| 6,834,531 B2 | 12/2004 | Rust |
| 6,840,292 B2 | 1/2005 | Hart et al. |
| 6,851,916 B2 | 2/2005 | Schmidt |
| 6,980,647 B1 | 12/2005 | Daugherty et al. |
| 6,987,877 B2 | 1/2006 | Paz-Pujalt et al. |
| 7,032,629 B1 | 4/2006 | Mattingly et al. |
| 7,091,421 B2 | 8/2006 | Kukita et al. |
| 7,186,321 B2 | 3/2007 | Benham |
| 7,258,710 B2 | 8/2007 | Caro et al. |
| 7,275,366 B2 | 10/2007 | Powell et al. |
| 7,294,913 B2 | 11/2007 | Fischer et al. |
| 7,385,681 B2 | 6/2008 | Ninomiya et al. |
| 7,444,996 B2 | 11/2008 | Potier |
| 7,459,067 B2 | 12/2008 | Dunn et al. |
| 7,564,540 B2 | 7/2009 | Paulson |
| 7,631,671 B2 | 12/2009 | Mattingly et al. |
| 7,729,561 B1 | 6/2010 | Boland et al. |
| 7,749,308 B2 | 7/2010 | McCully |
| 7,810,988 B2 | 10/2010 | Kamimura et al. |
| 7,815,744 B2 | 10/2010 | Abney et al. |
| 7,832,338 B2 | 11/2010 | Caro et al. |
| 7,879,204 B2 | 2/2011 | Funahashi |
| 8,075,651 B2 | 12/2011 | Caro et al. |
| 8,282,265 B2 | 10/2012 | Breithhaupt |
| 8,299,811 B2 | 10/2012 | Wing |
| 8,312,584 B2 | 11/2012 | Hodde |
| 8,327,631 B2 | 12/2012 | Caro et al. |
| 8,368,405 B2 | 2/2013 | Siebens |
| 8,376,432 B1 | 2/2013 | Halger et al. |
| 8,402,746 B2 | 3/2013 | Powell et al. |
| 8,413,484 B2 | 4/2013 | Lubkowitz |
| 8,414,781 B2 | 4/2013 | Berard |
| 8,577,518 B2 | 11/2013 | Linden et al. |
| 8,597,380 B2 | 12/2013 | Buchanan |
| 8,632,359 B2 | 1/2014 | Grimm |
| 8,647,162 B2 | 2/2014 | Henriksson et al. |
| 8,748,677 B2 | 6/2014 | Buchanan |
| 8,808,415 B2 | 8/2014 | Caro et al. |
| 8,979,982 B2 | 3/2015 | Jordan et al. |
| 9,038,855 B2 | 5/2015 | Lurcott et al. |
| 9,162,944 B2 | 10/2015 | Bennett et al. |
| 9,175,235 B2 | 11/2015 | Kastner |
| 9,222,480 B2 | 12/2015 | Younes et al. |
| 9,310,016 B2 | 4/2016 | Hodde |
| 9,329,066 B2 | 5/2016 | Skarping |
| 9,363,462 B2 | 6/2016 | Yoel |
| 9,388,350 B2 | 7/2016 | Buchanan |
| 9,518,693 B2 | 12/2016 | Hodde |
| 9,550,247 B2 | 1/2017 | Smith |
| 9,643,135 B1 | 5/2017 | Mazzei et al. |
| 9,945,333 B2 | 4/2018 | Kopinsky |
| 10,001,240 B1 | 6/2018 | Dray et al. |
| 10,012,340 B1 | 7/2018 | Dray et al. |
| 10,024,768 B1 | 7/2018 | Johnsen |
| 10,094,508 B1 | 10/2018 | Dray et al. |
| 10,168,255 B1 | 1/2019 | Johnsen |
| 10,196,243 B1 | 2/2019 | Wells |
| 10,197,206 B1 | 2/2019 | Dray et al. |
| 10,247,643 B1 | 4/2019 | Johnsen |
| 10,261,279 B1 | 4/2019 | Potter |

(56) References Cited

U.S. PATENT DOCUMENTS

| | | |
|---|---|---|
| 10,287,940 B2 | 5/2019 | Tonsich |
| 10,345,221 B1 | 7/2019 | Silverman |
| 10,364,718 B2 | 7/2019 | Eddaoudi et al. |
| 10,386,260 B2 | 8/2019 | Dudek |
| 10,408,377 B1 | 9/2019 | Dray et al. |
| 10,486,946 B1 | 11/2019 | Wells |
| 10,501,385 B1 | 12/2019 | Buckner et al. |
| 10,563,555 B2 | 2/2020 | Hamad |
| 10,570,581 B2 | 2/2020 | Faivre |
| 10,605,144 B2 | 3/2020 | Kobayashi |
| 10,633,830 B2 | 4/2020 | Shibamori |
| 10,655,774 B1 | 5/2020 | Dray et al. |
| 10,657,443 B2 | 5/2020 | Araujo et al. |
| 10,688,686 B2 | 6/2020 | Fadhel et al. |
| 10,756,459 B2 | 8/2020 | Jongsma |
| 10,833,434 B1 | 11/2020 | Tassell, Jr. |
| 10,943,357 B2 | 3/2021 | Badawy et al. |
| 10,948,471 B1 | 3/2021 | MacMullin et al. |
| 10,953,960 B1 | 3/2021 | Sharp |
| 10,962,437 B1 | 3/2021 | Nottrott et al. |
| 10,970,927 B2 | 4/2021 | Sharp |
| 10,990,114 B1 | 4/2021 | Miller |
| 10,997,707 B1 | 5/2021 | Katz et al. |
| 11,010,608 B2 | 5/2021 | Adam et al. |
| 11,112,308 B2 | 9/2021 | Kreitinger et al. |
| 11,125,391 B2 | 9/2021 | Al Khowaiter et al. |
| 11,132,008 B2 | 9/2021 | Miller |
| 11,164,406 B2 | 11/2021 | Meroux et al. |
| 11,221,107 B2 | 1/2022 | Du et al. |
| 11,247,184 B2 | 2/2022 | Miller |
| 11,325,687 B1 | 5/2022 | Sharp |
| 11,332,070 B2 | 5/2022 | Holden et al. |
| 11,345,455 B2 | 5/2022 | Sharp |
| 11,416,012 B2 | 8/2022 | Miller |
| 11,428,600 B2 | 8/2022 | Dankers et al. |
| 11,428,622 B2 | 8/2022 | Borin et al. |
| 11,447,877 B1 | 9/2022 | Ell |
| 11,559,774 B2 | 1/2023 | Miller |
| 11,565,221 B2 | 1/2023 | Miller |
| 11,578,638 B2 | 2/2023 | Thobe |
| 11,578,836 B2 | 2/2023 | Thobe |
| 11,596,910 B2 | 3/2023 | Miller |
| 11,607,654 B2 | 3/2023 | Miller |
| 11,655,748 B1 | 5/2023 | Thobe |
| 11,655,940 B2 | 5/2023 | Thobe |
| 11,662,750 B2 | 5/2023 | Miller |
| 11,686,070 B1 | 6/2023 | Jordan et al. |
| 11,715,950 B2 | 8/2023 | Miller et al. |
| 11,720,526 B2 | 8/2023 | Miller et al. |
| 11,739,679 B2 | 8/2023 | Thobe |
| 11,752,472 B2 | 9/2023 | Miller |
| 11,754,225 B2 | 9/2023 | Thobe |
| 11,774,042 B2 | 10/2023 | Thobe |
| 11,794,153 B2 | 10/2023 | Miller |
| 11,807,945 B2 | 11/2023 | Ell |
| 11,808,013 B1 | 11/2023 | Jordan et al. |
| 11,815,227 B2 | 11/2023 | Thobe |
| 11,920,504 B2 | 3/2024 | Thobe |
| 11,965,317 B2 | 4/2024 | Jordan |
| 2002/0014068 A1 | 2/2002 | Mittricker et al. |
| 2002/0178806 A1 | 12/2002 | Valentine |
| 2003/0041518 A1 | 3/2003 | Wallace et al. |
| 2003/0121481 A1 | 7/2003 | Dodd et al. |
| 2003/0158630 A1 | 8/2003 | Pham et al. |
| 2003/0167660 A1 | 9/2003 | Kondou |
| 2003/0178994 A1 | 9/2003 | Hurlimann et al. |
| 2003/0188536 A1 | 10/2003 | Mittricker |
| 2003/0197622 A1 | 10/2003 | Reynard et al. |
| 2003/0227821 A1 | 12/2003 | Bae et al. |
| 2004/0057334 A1 | 3/2004 | Wilmer et al. |
| 2004/0058597 A1 | 3/2004 | Matsuda |
| 2004/0067126 A1 | 4/2004 | Schmidt |
| 2004/0125688 A1 | 7/2004 | Kelley et al. |
| 2004/0249105 A1 | 12/2004 | Nolte et al. |
| 2004/0265653 A1 | 12/2004 | Buechi et al. |
| 2005/0007450 A1 | 1/2005 | Hill et al. |
| 2005/0058016 A1 | 3/2005 | Smith et al. |
| 2005/0146437 A1 | 7/2005 | Ward |
| 2005/0150820 A1 | 7/2005 | Guo |
| 2005/0154132 A1 | 7/2005 | Hakuta et al. |
| 2005/0284333 A1 | 12/2005 | Falkiewicz |
| 2006/0125826 A1 | 6/2006 | Lubkowitz |
| 2006/0278304 A1 | 12/2006 | Mattingly et al. |
| 2007/0175511 A1 | 8/2007 | Doerr |
| 2008/0092625 A1 | 4/2008 | Hinnrichs |
| 2008/0113884 A1 | 5/2008 | Campbell et al. |
| 2008/0115834 A1 | 5/2008 | Geoffrion et al. |
| 2008/0149481 A1* | 6/2008 | Hurt ...................... G01N 17/02 |
| | | 204/404 |
| 2008/0283083 A1 | 11/2008 | Piao |
| 2009/0009308 A1 | 1/2009 | Date et al. |
| 2009/0107111 A1 | 4/2009 | Oliver |
| 2009/0175738 A1 | 7/2009 | Shaimi |
| 2009/0183498 A1 | 7/2009 | Uchida et al. |
| 2009/0188565 A1 | 7/2009 | Satake |
| 2009/0197489 A1 | 8/2009 | Caro |
| 2010/0031825 A1 | 2/2010 | Kemp |
| 2010/0049410 A1 | 2/2010 | McKee |
| 2010/0058666 A1 | 3/2010 | Kim |
| 2010/0198775 A1 | 8/2010 | Rousselle |
| 2011/0265449 A1 | 11/2011 | Powell |
| 2012/0027298 A1 | 2/2012 | Dow |
| 2012/0092835 A1 | 4/2012 | Miller |
| 2012/0143560 A1 | 6/2012 | Tabet et al. |
| 2012/0185220 A1 | 7/2012 | Shippen |
| 2012/0276379 A1 | 11/2012 | Daniels et al. |
| 2012/0304625 A1 | 12/2012 | Daikoku |
| 2013/0035824 A1 | 2/2013 | Nakamura |
| 2013/0048094 A1 | 2/2013 | Ballantyne |
| 2013/0062258 A1 | 3/2013 | Ophus |
| 2013/0125323 A1 | 5/2013 | Henderson |
| 2013/0176656 A1 | 7/2013 | Kaisser |
| 2013/0186671 A1 | 7/2013 | Theis |
| 2013/0201025 A1 | 8/2013 | Kamalakannan et al. |
| 2013/0245524 A1 | 9/2013 | Schofield |
| 2013/0293884 A1 | 11/2013 | Lee et al. |
| 2013/0299500 A1 | 11/2013 | McKinnon |
| 2014/0002639 A1 | 1/2014 | Cheben et al. |
| 2014/0008926 A1 | 1/2014 | Allen |
| 2014/0062490 A1 | 3/2014 | Neuman et al. |
| 2014/0090379 A1 | 4/2014 | Powell et al. |
| 2014/0121622 A1 | 5/2014 | Jackson et al. |
| 2014/0158616 A1 | 6/2014 | Govind et al. |
| 2014/0158632 A1 | 6/2014 | Govind et al. |
| 2014/0171538 A1 | 6/2014 | Daniels et al. |
| 2014/0176344 A1 | 6/2014 | Littlestar |
| 2014/0190691 A1* | 7/2014 | Vinegar ................ E21B 43/305 |
| | | 166/272.1 |
| 2014/0194657 A1 | 7/2014 | Wadhwa et al. |
| 2014/0299039 A1 | 10/2014 | Trollux |
| 2014/0345370 A1 | 11/2014 | Marotta |
| 2014/0356707 A1 | 12/2014 | Kwon et al. |
| 2015/0081165 A1 | 3/2015 | Yamashita et al. |
| 2015/0144468 A1 | 5/2015 | Skolozdra |
| 2015/0183102 A1 | 7/2015 | Breschi et al. |
| 2015/0198518 A1 | 7/2015 | Borin et al. |
| 2015/0244087 A1 | 8/2015 | Wing |
| 2015/0323119 A1 | 11/2015 | Giunta |
| 2016/0091467 A1 | 3/2016 | Morris |
| 2016/0139355 A1* | 5/2016 | Petersen ............... G02B 6/4472 |
| | | 385/100 |
| 2016/0169098 A1 | 6/2016 | Makita |
| 2016/0169436 A1 | 6/2016 | Sander et al. |
| 2016/0175634 A1 | 6/2016 | Radian |
| 2016/0238194 A1 | 8/2016 | Adler et al. |
| 2016/0252650 A1 | 9/2016 | Hirst, Sr. |
| 2016/0363249 A1 | 12/2016 | Disher |
| 2016/0369930 A1 | 12/2016 | Poe et al. |
| 2017/0051472 A1 | 2/2017 | Mochimaru |
| 2017/0088401 A1 | 3/2017 | Clements et al. |
| 2017/0122174 A1 | 5/2017 | Patel |
| 2017/0131728 A1 | 5/2017 | Lambert et al. |
| 2017/0158303 A1 | 6/2017 | Michaelis et al. |
| 2017/0248569 A1 | 8/2017 | Ambert et al. |

(56) References Cited

U.S. PATENT DOCUMENTS

| | | |
|---|---|---|
| 2017/0253737 A1 | 9/2017 | Auld et al. |
| 2017/0253738 A1 | 9/2017 | Auld et al. |
| 2017/0253806 A1 | 9/2017 | Auld et al. |
| 2017/0254481 A1 | 9/2017 | Cadogan et al. |
| 2017/0259229 A1 | 9/2017 | Chou et al. |
| 2017/0306428 A1 | 10/2017 | Helgason et al. |
| 2017/0326474 A1 | 11/2017 | Olovsson |
| 2017/0367346 A1 | 12/2017 | Rees et al. |
| 2018/0002617 A1 | 1/2018 | Umansky et al. |
| 2018/0003116 A1 | 1/2018 | Fersman et al. |
| 2018/0037452 A1 | 2/2018 | Gray et al. |
| 2018/0080356 A1 | 3/2018 | Fukui |
| 2018/0098137 A1 | 4/2018 | Saha |
| 2018/0119882 A1 | 5/2018 | Allidieres et al. |
| 2018/0143734 A1 | 5/2018 | Ochenas et al. |
| 2018/0186528 A1* | 7/2018 | Tonn .................. G01F 11/16 |
| 2018/0218214 A1 | 8/2018 | Pestun |
| 2018/0223202 A1 | 8/2018 | Fransham et al. |
| 2018/0245313 A1 | 8/2018 | Shibamori et al. |
| 2018/0259064 A1 | 9/2018 | McLemore |
| 2018/0312391 A1 | 11/2018 | Borg |
| 2019/0016963 A1 | 1/2019 | Auld et al. |
| 2019/0121373 A1 | 4/2019 | Panigrahi |
| 2019/0367732 A1 | 5/2019 | Helgason et al. |
| 2019/0270500 A1 | 9/2019 | Hamaoka |
| 2019/0338203 A1 | 11/2019 | Umansky et al. |
| 2019/0359899 A1 | 11/2019 | Umansky et al. |
| 2019/0362147 A1 | 11/2019 | Adam |
| 2019/0136060 A1 | 12/2019 | Helgason et al. |
| 2019/0368054 A1 | 12/2019 | Gummow et al. |
| 2019/0368156 A1 | 12/2019 | Faivre |
| 2020/0033252 A1 | 1/2020 | Borin et al. |
| 2020/0118413 A1 | 4/2020 | Kanukurthy |
| 2020/0232191 A1 | 7/2020 | Prior |
| 2020/0240588 A1 | 7/2020 | Al Khowaiter |
| 2020/0245551 A1 | 8/2020 | Hoffman et al. |
| 2020/0245552 A1 | 8/2020 | Hoffman et al. |
| 2020/0245553 A1 | 8/2020 | Hoffman et al. |
| 2020/0292445 A1 | 9/2020 | Morimoto |
| 2020/0325742 A1 | 10/2020 | Astudillo et al. |
| 2021/0053011 A1 | 2/2021 | Sugiyama et al. |
| 2021/0062697 A1 | 3/2021 | Yokoyama et al. |
| 2021/0073692 A1 | 3/2021 | Saha et al. |
| 2021/0076006 A1 | 3/2021 | O'Neill et al. |
| 2021/0095380 A1 | 4/2021 | Borin et al. |
| 2021/0123211 A1 | 4/2021 | Miller et al. |
| 2021/0138399 A1 | 5/2021 | Yokoyama et al. |
| 2021/0197151 A1 | 7/2021 | Miller |
| 2021/0207772 A1 | 7/2021 | Norton et al. |
| 2021/0215925 A1 | 7/2021 | Kim et al. |
| 2021/0216852 A1 | 7/2021 | Reece et al. |
| 2021/0232163 A1 | 7/2021 | Miller |
| 2021/0232741 A1 | 7/2021 | Ogiso et al. |
| 2021/0362637 A1 | 11/2021 | Hanis et al. |
| 2021/0381920 A1 | 12/2021 | Jacobsz et al. |
| 2022/0001969 A1 | 1/2022 | Pugnetti |
| 2022/0010707 A1 | 1/2022 | Sharma et al. |
| 2022/0048606 A1 | 2/2022 | Singh |
| 2022/0081261 A1 | 3/2022 | Karbassi |
| 2022/0087099 A1 | 3/2022 | Hoffman et al. |
| 2022/0154427 A1 | 5/2022 | Misaki |
| 2022/0178114 A1 | 6/2022 | Takahama |
| 2022/0186470 A1 | 6/2022 | Chiba et al. |
| 2022/0213603 A1 | 7/2022 | Al Eid et al. |
| 2022/0221368 A1 | 7/2022 | Bergeron |
| 2022/0228345 A1 | 7/2022 | Case et al. |
| 2022/0282651 A1 | 9/2022 | Reynolds et al. |
| 2022/0290411 A1 | 9/2022 | Anahara et al. |
| 2022/0343229 A1 | 10/2022 | Gruber et al. |
| 2022/0401899 A1 | 12/2022 | Miller |
| 2022/0404272 A1 | 12/2022 | Kendall et al. |
| 2023/0015077 A1 | 1/2023 | Kim |
| 2023/0061824 A1 | 3/2023 | Ell |
| 2023/0078852 A1 | 3/2023 | Campbell et al. |
| 2023/0129513 A1 | 4/2023 | Miller |
| 2023/0259080 A1 | 8/2023 | Whikehart et al. |
| 2023/0259088 A1 | 8/2023 | Borup et al. |
| 2023/0332532 A1 | 10/2023 | Thobe |
| 2023/0333577 A1 | 10/2023 | Miller |
| 2023/0333578 A1 | 10/2023 | Miller |
| 2023/0341092 A1 | 10/2023 | Thobe |
| 2023/0347303 A1 | 11/2023 | Miller |
| 2023/0358023 A1 | 11/2023 | Jordan et al. |
| 2023/0366510 A1 | 11/2023 | Thobe |
| 2023/0383416 A1 | 11/2023 | Ell |
| 2023/0383417 A1 | 11/2023 | Ell |
| 2023/0392536 A1 | 12/2023 | Thobe |
| 2023/0399817 A1 | 12/2023 | Jordan |
| 2023/0399818 A1 | 12/2023 | Jordan |
| 2023/0407488 A1 | 12/2023 | Ell |
| 2023/0415106 A1 | 12/2023 | Miller |
| 2024/0003016 A1 | 1/2024 | Ell |
| 2024/0060189 A1 | 2/2024 | Ell |
| 2024/0141506 A1 | 5/2024 | Ell |

FOREIGN PATENT DOCUMENTS

| | | |
|---|---|---|
| CA | 2447358 | 4/2005 |
| CA | 2702151 | 10/2007 |
| CA | 2637421 | 1/2010 |
| CA | 2642295 | 1/2010 |
| CA | 2736733 | 10/2011 |
| CA | 2958443 | 4/2017 |
| CA | 2995532 | 4/2017 |
| CA | 2916141 | 6/2017 |
| CN | 2092562 | 1/1992 |
| CN | 200958686 | 10/2007 |
| CN | 100348970 | 11/2007 |
| CN | 102997052 | 3/2013 |
| CN | 103106764 | 5/2013 |
| CN | 103497804 | 1/2014 |
| CN | 102997061 | 5/2015 |
| CN | 204824775 | 12/2015 |
| CN | 205640252 | 10/2016 |
| CN | 106764463 | 1/2019 |
| CN | 110513604 | 11/2019 |
| CN | 210176958 | 3/2020 |
| CN | 111537157 | 8/2020 |
| CN | 114001278 | 2/2022 |
| CN | 114877263 | 4/2023 |
| EP | 2602609 | 6/2013 |
| EP | 3076461 | 10/2016 |
| EP | 3101411 | 12/2016 |
| EP | 3112011 | 1/2017 |
| EP | 2994626 | 1/2018 |
| EP | 3285759 | 2/2018 |
| ES | 2398302 | 3/2013 |
| FR | 2388762 | 11/1978 |
| FR | 2689241 | 10/1993 |
| GB | 1179978 | 2/1970 |
| GB | 2097687 | 11/1982 |
| GB | 2545207 | 6/2017 |
| GB | 2559149 | 4/2022 |
| IN | 202141001384 | 1/2021 |
| IT | 201900008235 | 12/2020 |
| JP | 2004125039 | 4/2004 |
| JP | 2007204023 | 8/2007 |
| JP | 2008097832 | 4/2008 |
| JP | 2012002159 | 11/2014 |
| JP | 2016078893 | 5/2016 |
| KR | 20110010316 | 2/2011 |
| KR | 20130038986 | 4/2013 |
| KR | 102129951 | 7/2020 |
| KR | 102169280 | 10/2020 |
| KR | 102281640 | 7/2021 |
| RU | 2760879 | 12/2021 |
| WO | 1996006685 | 5/1996 |
| WO | 1997006004 | 2/1997 |
| WO | 1997006298 | 2/1997 |
| WO | 1998003711 | 1/1998 |
| WO | 2000063108 | 10/2000 |
| WO | 2002030551 | 4/2002 |
| WO | 2003003002 | 1/2003 |
| WO | 2003066423 | 8/2003 |

(56) References Cited

FOREIGN PATENT DOCUMENTS

| | | |
|---|---|---|
| WO | 2004003293 | 1/2004 |
| WO | 2004092307 | 10/2004 |
| WO | 2005018300 | 3/2005 |
| WO | 2007107652 | 9/2007 |
| WO | 2007112335 | 10/2007 |
| WO | 2007149851 | 12/2007 |
| WO | 2009013544 | 1/2009 |
| WO | 2009055024 | 4/2009 |
| WO | 2010042704 | 4/2010 |
| WO | 2010103260 | 9/2010 |
| WO | 2013112274 | 8/2013 |
| WO | 2014089443 | 6/2014 |
| WO | 2014173672 | 10/2014 |
| WO | 2015061868 | 5/2015 |
| WO | 2015153607 | 10/2015 |
| WO | 2016004107 | 1/2016 |
| WO | 2016026043 | 2/2016 |
| WO | 2016146404 | 9/2016 |
| WO | 2017074985 | 5/2017 |
| WO | 2017083778 | 5/2017 |
| WO | 2017087731 | 5/2017 |
| WO | 2017152269 | 9/2017 |
| WO | 2018005141 | 1/2018 |
| WO | 2018102378 | 6/2018 |
| WO | 2020044026 | 3/2020 |
| WO | 2020118020 | 6/2020 |
| WO | 2020132632 | 6/2020 |
| WO | 2020223803 | 11/2020 |
| WO | 2020237112 | 11/2020 |
| WO | 2021062563 | 4/2021 |
| WO | 2021100054 | 5/2021 |
| WO | 2022043197 | 3/2022 |
| WO | 2022126092 | 6/2022 |
| WO | 2022149501 | 7/2022 |
| WO | 2023287276 | 1/2023 |
| WO | 2023038579 | 3/2023 |
| WO | 2023137304 | 7/2023 |
| WO | 2023164683 | 8/2023 |
| ZA | 9606765 | 2/1998 |
| ZA | 200610366 | 1/2008 |

OTHER PUBLICATIONS

Hou, Qingmin, An FBG Strain Sensor-Based NPW Method for Natural Gas Pipeline Leakage Detection, Hindawi, Mathematical Problems in Engineering, vol. 2021, Article ID 5548503, pp. 1-8.
Alexandrakis et al., "Marine Transportation for Carbon Capture and Sequestration (CCS)", Department of Civil and Environmental Engineering, Thesis, Massachusetts Institute of Technology, Jun. 2010.
Datta et al., "Advancing carbon management through the global commoditization of CO2: the case for dual-use LNG-CO2 shipping", Carbon Management, 2020, vol. 11, No. 6, 611-630.
Bitoye et al., "Poster Abstract: A Convolutional Neural Network Based Solution for Pipeline Leak Detection", School of Information Technology, Carleton University, Ottawa, Canada, Nov. 2019.
Intelliview, "Thermal Imaging Provides Early Leak Detection in Oil and Gas Pipelines", Petro Industry News, www.Petro-Online.com, Aug./Sep. 2018.
Southwest Research Institute, "Methane Leak Detection", 2021.
Masterduct, "Case Studies: High temp marine grade ship engine exhaust fume hose", retrieved at https://www.masterduct.com/CaseStudies/Hightempshipengineexhaustfumehose.aspx.
Acti, "Advanced Maritime Emissions Control System (AMECS)", retrieved at https://sustainableworldports.org/wp-content/uploads/presentation-on-AMECS.pdf.
Skelton et al., Onboard Refueling Vapor Recovery Systems Analysis of Widespread Use,Nescaum, Boston MA, Aug. 20, 2007.
Membrane Technology and Research, Inc., Gasoline Vapor Recovery, 2018.
Jordan Technologies, Aereon, Recovering More Vapor=Increased Profits, 2015.
EPFL, Capturing CO2 from trucks and reducing their emissions by 90%, Dec. 23, 2019.
Sharma, Shivom et al., Carbon Dioxide Capture from Internal Combustion Engine Exhaust Using Temperature Swing Adsorption, Front. Energy Res., Sec. Carbon Capture, Utilization and Storage, Dec. 16, 2019.
Information Disclosure Declaration by Kyle E. Miller, Dec. 18, 2020.
Cott Manufacturing Company, FinkLet®/FinkPlate® Cathodic Proection Test Stations, Wayback Machine, May 22, 2000.
Borin Manufacturing, Inc., Dart for Test Station, Above Ground Remote Monitoring, Feb. 11, 2021.
Borin Manufacturing, Inc., Commanche Remote Monitoring and Control System, Mar. 24, 2017.
Borin Manufacturing, Inc., Dart for Rectifiers, Remote Monitoring and Control System. Nov. 1, 2017.
Borin Manufacturing, Inc., Stelth 2 Solid-State Reference Electrode for Buried and Concrete Service, Aug. 7, 2018.
Borin Manufacturing, Inc., Stelth 3, Nov. 10, 2016.
Borin Manufacturing, Inc., Stelth Reference Electrodes, Feb. 4, 2016.
Borin Manufacturing, Inc., Stelth Solid-State Reference Electrodes, Nov. 8, 2016.
Borin Manufacturing, Inc., Stelth Reference Electrodes, Oct. 10, 2017.
Borin Manufacturing, Inc., 'Miracle half-cell', Palladium: Borin's new reference electrode chemistry, Aug. 13, 2014.
Borin Manufacturing, Inc., Street Dart, For Test Station, Ground Level Remote Monitoring, Mar. 2017.
Lloyd's Register, Using technology to trace the carbon intensity of sustainable marine fuels, Feb. 15, 2023.

* cited by examiner

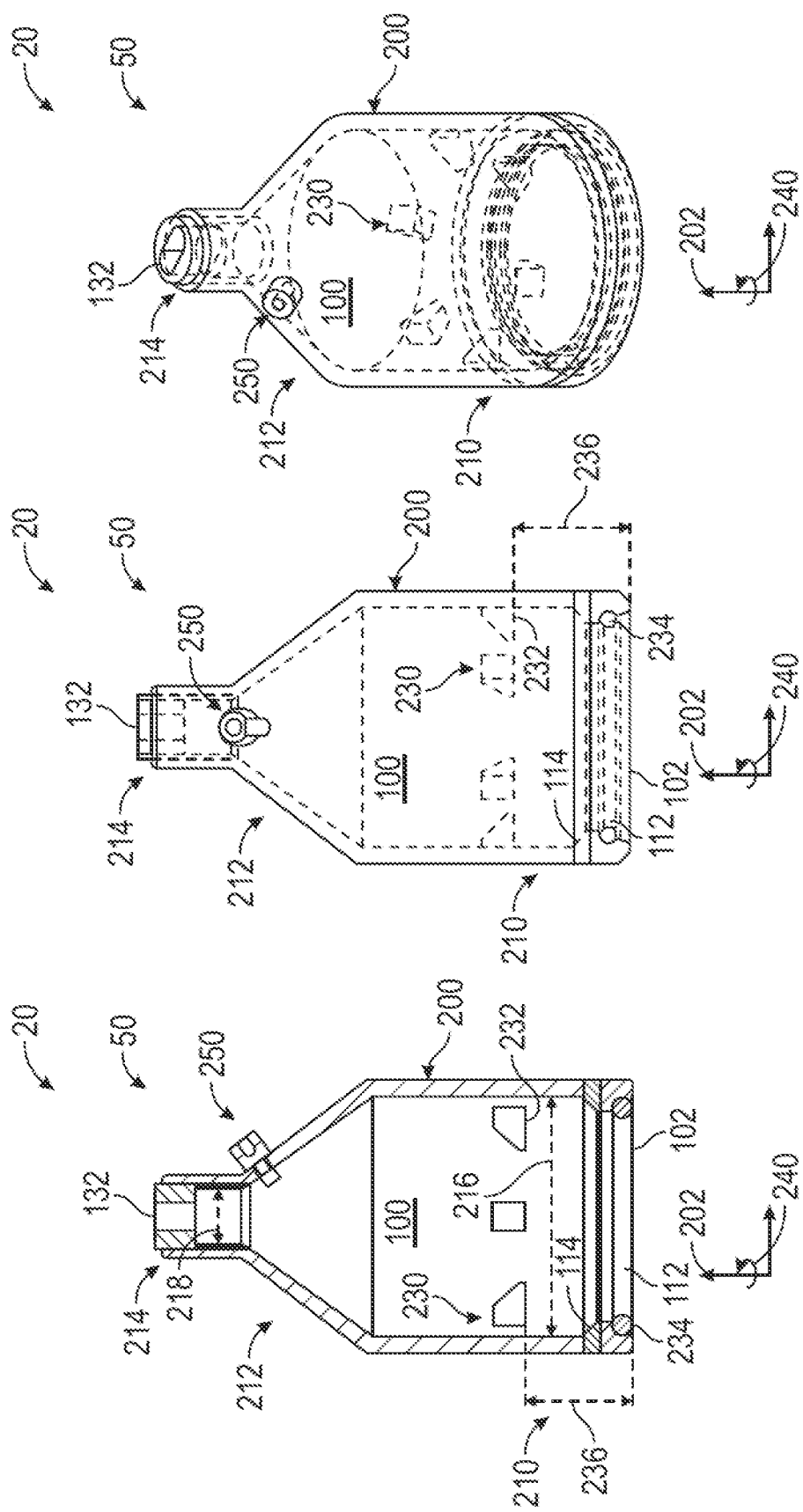

ELECTRODE WATERING ASSEMBLIES AND METHODS FOR MAINTAINING CATHODIC MONITORING OF STRUCTURES

CROSS-REFERENCE TO RELATED APPLICATIONS

The present application claims priority to and the benefit of U.S. Provisional Application No. 63/466,056, filed May 12, 2023, titled "TEST STATION ASSEMBLIES FOR MONITORING CATHODIC PROTECTION OF STRUCTURES AND RELATED METHODS," U.S. Provisional Application No. 63/466,062, filed May 12, 2023, titled "TEST STATION ASSEMBLIES FOR MONITORING CATHODIC PROTECTION OF STRUCTURES AND RELATED METHODS," and U.S. Provisional Application No. 63/513,391, filed Jul. 13, 2023, titled "ELECTRODE WATERING ASSEMBLIES AND METHODS FOR MAINTAINING CATHODIC MONITORING OF STRUCTURES," the disclosures of each of which are incorporated herein by reference in their entireties. The present application is also a continuation-in-part of U.S. Non-Provisional application Ser. No. 17/886,178, filed Aug. 11, 2022, titled "ASSEMBLIES AND METHODS FOR MONITORING CATHODIC PROTECTION OF STRUCTURES," which is a divisional of U.S. Non-Provisional application Ser. No. 17/805,801, filed Jun. 7, 2022, titled "ASSEMBLIES AND METHODS FOR MONITORING CATHODIC PROTECTION OF STRUCTURES," now U.S. Pat. No. 11,447,877, issued Sep. 20, 2022, which claims priority to and the benefit of U.S. Provisional Application No. 63/365,102, filed May 20, 2022, titled "ASSEMBLIES AND METHODS FOR MONITORING CATHODIC PROTECTION OF STRUCTURES," and U.S. Provisional Application No. 63/260,622, filed Aug. 26, 2021, titled "MINIATURE IR ERROR-FREE CATHODIC PROTECTION COUPON ASSEMBLY INSTALLED VIA PROBE," the disclosures of each of which are incorporated herein by reference in their entireties.

TECHNICAL FIELD

The present disclosure relates to assemblies and methods for maintaining cathodic monitoring of underground structures and, more particularly, to assemblies and methods including an electrode watering assembly for maintaining permanent reference electrodes employed to monitor the cathodic protection of underground structures.

BACKGROUND

Cathodic protection of metallic structures covered in an electrolyte associated with soil or a fluid is an established technique for reducing the rate of corrosion of the structure. Such cathodic protection may be facilitated by a cathodic protection system, which may use an electrical energy source to provide a cathodic current distributed over the surface of the structure, which may take the form of sacrificial anodes, AC-to-DC rectifiers, and/or direct DC sources (such as batteries, solar panels, and so forth). Once the cathodic protection system has been implemented, the effectiveness of the protection resulting from operation of the cathodic protection system may be assessed by measuring the potential difference between the structure and a reference electrode associated with an assembly used to assess the effectiveness. The reference electrode may therefore be used to monitor cathodic protection criteria or conditions of cathodic protection provided to the structure from adjacent to its underground or otherwise submerged position.

Compared to portable reference electrodes, permanent reference electrodes for cathodic protection may enable technicians to take more accurate measurements of electrolyte potential of an underground working electrode. For example, the measurements may be improved based on the reduced distance between the permanent reference electrode and the working electrode disposed underground, thus generating less IR-error compared to a portable reference electrode held by a technician. In certain cases, an industry-standard permanent reference electrode is provided that uses a solid electrolyte compound, which may face minimal degradation over time and generally includes a longer life span than alternatives.

However, the solid electrolyte compound may dry out over time in some cases and, thus, diminish in its ability to provide accurate electrolyte potential measurements. Moreover, based on the positioning underground or underneath a structure equipped with cathodic protection, these permanent reference electrodes are not easily maintained via replenishing moisture in the solid electrolyte compound or a surrounding sand backfill. As such, the useful life of the permanent reference electrodes can be cut much shorter than their intended design life. Accordingly, Applicant has recognized that there may be a desire to provide improved assemblies and methods for maintaining operation of permanent reference electrodes associated with cathodically protected structures to ensure the continuous, reliable operation thereof. The present disclosure may address one or more of the above-referenced considerations, as well as possibly others.

SUMMARY

As referenced above, it may be desirable to provide improved assemblies and methods for providing in-situ maintenance of permanent reference electrodes of a cathodically protected structure that is at least partially buried or submerged. The assemblies and methods disclosed herein may be more efficient, more effective, and less costly than other permanent reference electrode maintenance operations known to date. In some embodiments, the assemblies and methods may facilitate maintenance of cathodic protection monitoring for a variety of at least partially buried or submerged structures such as, for example, pipelines, storage tanks, offshore platforms, well casings, and more.

For example, certain embodiments include an electrode watering assembly having a conduit or tubing that may be fluidly coupled to a cap provided for a permanent reference electrode. The conduit is connected to an embedded water reservoir or cap that is inserted over an end of an existing permanent reference electrode, which may include an electrical conductor or test lead wire extending therefrom. A length of the conduit may extend along a length of the electrical conductor, in certain embodiments, to improve installation procedures. Moreover, the cap of the watering assembly may be constructed to retrofit over an existing permanent reference electrode. To align with the permanent reference electrode, the cap may be designed with a cylindrical bottom portion and a conical top portion. The inner diameter of the bottom portion may be slightly larger than the outer diameter of the reference electrode, thereby providing a close fit. A rubber or silicone O-ring or gasket may be added to the bottom portion to fill any gap or space formed when installing the cap, thus making the connection therebetween waterproof. The inner cavity of the cap may be hollow and may be utilized as a water storage reservoir. An opening may be formed through the top portion of the cap to receive the electrical conductor from the permanent reference electrode, as well as the conduit. A piece of shrink wrap tape or tubing or another suitable waterproof connector may be used to seal the connection of the electrical conductor and conduit to the top portion of the cap. The electrical conductor and conduit are then directed together to a cathodic protection test station for termination at a convenient, above-ground location.

In certain embodiments, fluid may therefore be injected into the embedded water reservoir or cap through the conduit at an above-ground test station to flow downward to the generally otherwise inaccessible permanent reference electrode. Based on the reservoir retained against the permanent reference electrode, water may be directed to resupply solid or gel electrolyte compound (and the surrounding backfill) with moisture long after installation, thus ensuring accurate measurements may be obtained for the full life of the permanent reference electrode and its corresponding submerged structure. When needed, such as at regular intervals or when a decline in testing accuracy is noted, water may be injected into the plastic tubing at the test station to flow downward through the tubing and into the cap. Based on diffusion, osmosis, and/or gravity forces, water may then impregnate the dry porous membrane of the permanent reference electrode and surrounding backfill, allowing for accurate measurements to be taken once again from the electrical conductor for improved monitoring of cathodic protection.

In some embodiments, an electrode watering system is provided to maintain cathodic monitoring of a structure at least partially underground. The electrode watering system may include a permanent reference electrode configured to monitor cathodic protection of the structure. The permanent reference electrode may include a proximal electrode end, a distal electrode end, and an electrode therebetween. The electrode watering system may include a cap that includes a cap body defining a reservoir adjacent to the proximal electrode end. The cap body may include a distal cap end defining a distal opening disposed around the proximal electrode end and a proximal cap end defining a proximal opening. The electrode watering system further may include an electrical conductor electrically coupled to the electrode, where the electrical conductor extends from the proximal electrode end and through the distal opening, the reservoir, and the proximal opening. The electrode watering system may also include a conduit having a distal conduit end fluidly coupled to the proximal opening and a proximal conduit end configured to be positioned at a cathodic test station. As such, fluid directed into the proximal conduit end may be directed through the conduit and into the reservoir for watering the proximal electrode end.

In some embodiments, an electrode watering assembly is provided to maintain operation of a permanent reference electrode for monitoring cathodic protection of a structure. The electrode watering assembly may include a cap that includes a cap body of a rigid material that defines one or more chambers adjacent to a proximal electrode end of the permanent reference electrode when installed thereon. The cap body may include a distal cap end defining a distal opening configured to be disposed around the proximal electrode end and a proximal cap end defining a proximal opening. The electrode watering assembly may also include a conduit including a flexible material. The conduit may include a distal conduit end configured to be fluidly coupled to the proximal opening and a proximal conduit end configured to be positioned at a cathodic test station, such that fluid directed into the proximal conduit end is directed through the conduit and into the one or more chambers for watering at least the proximal electrode end.

In some embodiments, a method is provided for installing an electrode watering assembly to maintain cathodic monitoring of a structure at least partially underground. The method may include passing a cap, having a reservoir defined within a cap body and between a proximal cap end and a distal cap end of the cap body, over an electrical conductor to position the distal cap end around a proximal electrode end of a permanent reference electrode. As such, the electrical conductor extends from the permanent reference electrode and through the distal cap end, the reservoir, and the proximal cap end. The method may further include fluidly coupling a distal conduit end of a conduit to the proximal cap end. Additionally, the method may include positioning a proximal conduit end of the conduit at a cathodic test station. Therefore, fluid directed into the proximal conduit end is directed through the conduit and into the reservoir for watering the proximal electrode end.

In some embodiments, a method is provided for using an electrode watering assembly to maintain cathodic monitoring of a structure at least partially underground. The method may include supplying a flow of fluid into a proximal conduit end of a conduit from an above-ground test station, thereby to direct the fluid to a distal conduit end of the conduit and to a reservoir within a cap disposed around a permanent reference electrode. The method may also include wetting an electrolyte compound within the permanent reference electrode with the fluid in the reservoir of the cap. Moreover, the method may include performing one or more tests with the permanent reference electrode to monitor cathodic protection of the structure from the above-ground test station.

In some embodiments, a kit is provided that includes a container. The kit may also include one or more caps positioned in the container. Each cap of the one or more caps may include a cap body that defines a reservoir adjacent to a proximal electrode end of a respective permanent reference electrode when installed thereon. The cap body may have a distal cap end defining a distal opening configured to be disposed around the proximal electrode end and a proximal cap end defining a proximal opening. The kit may include one or more conduits positioned in the container. Each conduit of the one or more conduits may include a flexible material. Each conduit may include a distal conduit end configured to be fluidly coupled to the proximal opening and a proximal conduit end configured to be positioned at a cathodic test station, such that fluid directed into the proximal conduit end is directed through the conduit and into the reservoir for watering at least the proximal electrode end.

Still other aspects and advantages of these exemplary embodiments and other embodiments are discussed in detail herein. Moreover, it is to be understood that both the foregoing information and the following detailed description provide merely illustrative examples of various aspects and embodiments, and are intended to provide an overview or framework for understanding the nature and character of the claimed aspects and embodiments. Accordingly, these and other objects, along with advantages and features of the present disclosure, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain principles of the embodiments discussed herein. No attempt is made to show structural details of this disclosure in more detail than can be necessary for a fundamental understanding of the embodiments discussed herein and the various ways in which they may be practiced. According to common practice, the various features of the drawings discussed below are not necessarily drawn to scale. Dimensions of various features and elements in the drawings may be expanded or reduced to illustrate embodiments of the disclosure more clearly.

FIG. 3A is a schematic cross-sectional view of an example cap of the example electrode watering assembly shown in FIG. 2A, according to embodiments of the disclosure.

FIG. 3B is a schematic side view of the example cap shown in FIG. 3A, according to embodiments of the disclosure.

FIG. 3C is a schematic perspective view of the example cap shown in FIG. 3A, according to embodiments of the disclosure.

DETAILED DESCRIPTION

The drawings include like numerals to indicate like parts throughout the several views. The following description is provided as an enabling teaching of exemplary embodiments, and those skilled in the relevant art will recognize that many changes may be made to the embodiments described. It also will be apparent that some of the desired benefits of the embodiments described may be obtained by selecting some of the features of the embodiments without utilizing other features. Accordingly, those skilled in the art will recognize that many modifications and adaptations to the embodiments described are possible and may even be desirable in certain circumstances. Thus, the following description is provided as illustrative of the principles of the embodiments and not in limitation thereof.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, in particular, to mean "including but not limited to," unless otherwise stated. Thus, the use of such terms is meant to encompass the items listed thereafter, and equivalents thereof, as well as additional items. The transitional phrases "consisting of" and "consisting essentially of," are closed or semi-closed transitional phrases, respectively, with respect to any claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements. Similarly, the term "proximal" is understood to mean closer to, or in the direction of, a technician or operator. Accordingly, "distal" is understood to mean a location or direction distant to or directed away from the technician or operator.

Figure 1:
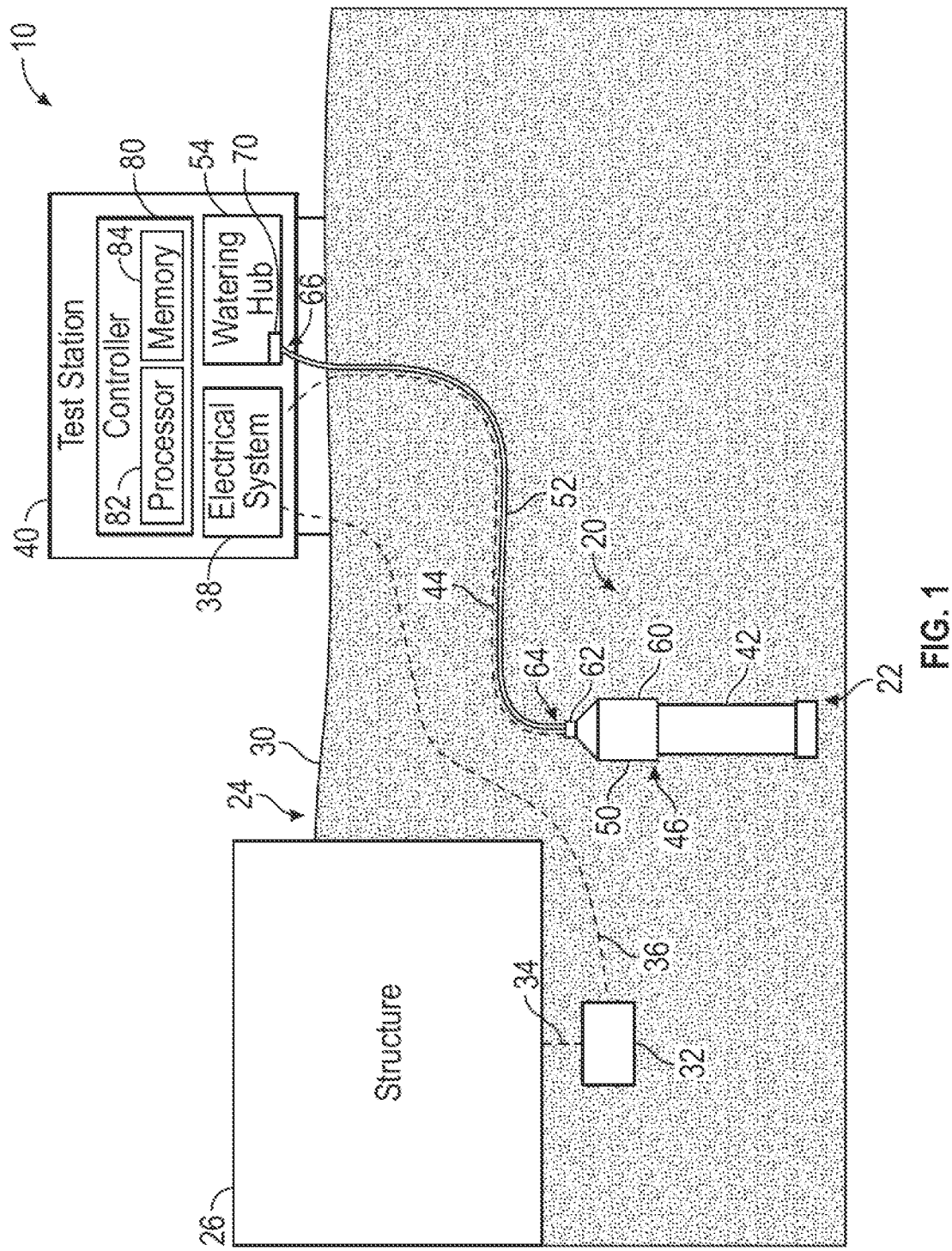
FIG. 1 is a schematic illustration of an example electrode watering system including an example electrode watering assembly for maintaining operation of a permanent reference electrode, according to embodiments of the disclosure.

FIG. 1 is a schematic illustration of an example electrode watering system 10 including an example electrode watering assembly 20 for maintaining operation of a permanent reference electrode 22, according to embodiments of the disclosure. As shown in FIG. 1, a cathodic protection system 24 is provided to provide cathodic protection for a structure 26 (not to scale) that is at least partially buried in the ground 30. For example, the structure 26 may be electrically connected to a sacrificial anode 32 via an electrical conductor 34 or, in embodiments, the sacrificial anode 32 may be placed in direct contact with a surface of the structure 26. Another electrical conductor 36 may extend from the sacrificial anode 32 to an electrical system 38 of a test station 40 or cathodic test station, in certain embodiments. Additionally, the permanent reference electrode 22 of the cathodic protection system 24 may be installed in a subterranean position within soil or suitable filler in the ground 30. The permanent reference electrode 22 of certain embodiments includes an electrode element that is in contact with electrolyte compound and retained within a housing or body 42, as will be discussed in more detail with reference to later figures. In embodiments, an electrical conductor 44 may be extended from a first or proximal electrode end 46 of the permanent reference electrode 22 to the electrical system 38 of the test station 40. The electrical system 38 may include a voltage measuring device that facilitates monitoring of the cathodic protection provided to the structure 26, such as based at least in part on a voltage or other cathodic criteria associated with the permanent reference electrode 22. In embodiments, the test station 40 provides a convenient, above ground location from which technicians may evaluate the operation of the cathodic protection system 24.

As presently recognized, the electrode watering assembly 20 is provided within the electrode watering system 10 to facilitate long-term, convenient maintenance and/or monitoring of the cathodic protection system 24. In the illustrated embodiment, the electrode watering assembly 20 includes a cap 50 that is coupled to the body 42 of the permanent reference electrode 22, as well as a conduit 52 that extends from the cap 50 to a watering hub 54 of the test station 40. In more detail, a second or distal cap end 60 of the cap 50 is fitted over the proximal electrode end 46 of the permanent reference electrode 22, which may include the electrical conductor 44 electrically coupled thereto and protruding therefrom. The electrical conductor 44 may therefore extend through the distal cap end 60, through a reservoir within the cap 50, through a first or proximal cap end 62 of the cap 50, and to the electrical system 38 of the test station 40. The cap 50 may be constructed from a water-resistant and/or rigid material, such as a plastic, a resin, and/or a polymer. As will be fully understood with reference to later figures, the material of the cap 50 defines one or more reservoirs or chambers therein that receive fluid from the conduit 52 and precisely direct the fluid to targeted components of the permanent reference electrode 22.

In embodiments, the conduit 52 includes a second or distal conduit end 64 that is coupled to the proximal cap end 62 of the cap 50 and a first or proximal conduit end 66 that is coupled to the watering hub 54 of the test station 40. In certain embodiments, the conduit 52 is a flexible tube made of a flexible material, such as plastic, polymer, or rubber material that may traverse through the ground 30 in a similar manner as the electrical conductor 44 of the permanent reference electrode 22. That is, the conduit 52 may be positioned to extend generally parallel with the electrical conductor 44 throughout all or a majority of an underground distance covered by the conduit 52. This close positioning may desirably reduce an installation difficulty or effort used for installing the electrode watering assembly 20, compared to arrangements in which different paths through the ground 30 are provided for an electrical conductor and a conduit.

In certain embodiments, the watering hub 54 may include an inlet port 70 that is readily accessible to a technician that is at the test station 40. For example, the inlet port 70 may include a funnel, basin, or other water-directing component for receiving fluid and directing the fluid into the proximal conduit end 66 of the conduit 52. In certain embodiments, a technician may direct a flow of water to the proximal conduit end 66 via a pressurized water source, such as a spraying assembly having a vessel pressurized with a pump or trigger. In such cases, the spraying assembly may include a fitting, such as a nozzle that directs water into the proximal conduit end 66 or an inlet port 70 attached thereto. In some embodiments, the spraying assembly may include a retainment cap having an opening therethrough for retain an interconnecting conduit that may be positioned within the proximal conduit end 66. The technician may therefore pressurize the vessel and efficiently direct a flow of water through the interconnecting conduit, into the conduit 52, and to the cap 50.

In embodiments, multiple permanent reference electrodes 22 may be maintained with the present techniques. Such embodiments may include 2, 3, 4, 5, 6, 7, 8, 9, 10, or more permanent reference electrodes 22. A respective cap 50 may be provided on each permanent reference electrode 22 and coupled to a respective conduit 52 having a proximal conduit end 66 positioned near the test station 40. The proximal conduit end 66 of the multiple conduits 52 may be coupled to a manifold of the watering hub 54, in certain embodiments. In embodiments, the proximal conduit ends 66 may not be coupled with a manifold and instead be arranged within close proximity to one another, thus enabling a technician to direct fluid within one or multiple inlet ends as desired, in parallel to one another.

In certain embodiments, the electrode watering system 10 and/or electrode watering assembly 20 may also include a controller 80 to manage operation of all or a portion of the electrode watering system 10. For example, the illustrated embodiment includes the controller 80 positioned at the test station 40. Certain embodiments may additionally or alternatively include one or more control components at a location that is remote to the test station 40, such as at a service center. The controller 80 may be in signal communication with various other components associated with the electrode watering system 10. For example, the controller 80 may be in signal communication with one or more components of the electrical system 38, one or more components of the watering hub 54, or a combination thereof. Certain embodiments may also include the controller 80 being in signal communication with one or more user devices associated with a technician or a service center.

The controller 80 may be provided to perform or coordinate various actions within the electrode watering system 10, such as performing tests via the electrical system 38, detecting a current status of the permanent reference electrode 22, instructing an actuator to supply fluid from a fluid source and into the conduit 52, providing an alert to a user device indicative of a request for a technician to provide fluid into the conduit 52, and so forth. Further examples of operation of the controller are provided with reference to later figures.

The controller 80 may include one or more processors 82 and one or more memories 84, such as a machine-readable storage medium. As used herein, a "machine-readable storage medium" may be any electronic, magnetic, optical, or other physical storage apparatus to contain or store information such as executable instructions, data, and the like. For example, any machine-readable storage medium described herein may be any of random access memory (RAM), volatile memory, non-volatile memory, flash memory, a storage drive (such as a hard drive), a solid state drive, any type of storage disc, and the like, or a combination thereof. The memory 306 may store or include instructions executable by the processor 304. As used herein, a "processor" may include, for example one processor or multiple processors included in a single device or distributed across multiple computing devices. The processor 304 may be at least one of a central processing unit (CPU), a semiconductor-based microprocessor, a graphics processing unit (GPU), a field-programmable gate array (FPGA) to retrieve and execute instructions, a real time processor (RTP), other electronic circuitry suitable for the retrieval and execution instructions stored on a machine-readable storage medium, or a combination thereof.

As used herein, "signal communication" refers to electric communication such as hard wiring two components together or wireless communication, as understood by those skilled in the art. For example, wireless communication may be Wi-Fi®, Bluetooth®, ZigBee, or forms of near field communications. In addition, signal communication may include one or more intermediate controllers or relays disposed between elements that are in signal communication with one another. In the drawings and specification, several embodiments of electrode watering systems 10 and electrode watering assemblies 20 and methods of operating the same are disclosed. The controller 80 may include instructions, software programs, and/or algorithms to facilitate performance of these methods.

In an embodiment, various sensors, meters, and/or transmitters may be disposed through the electrode watering system 10. These sensing components may be in signal communication with the controller 80 and may provide data or feedback to the controller 80 to determine various sensor data associated with the operation, status, and maintenance of the permanent reference electrode 22. The sensors may measure or detect any suitable operating parameters to enable the controller 80 and/or a technician to monitor operation of the electrode watering system 10, such as voltage or other cathodic criteria or parameters associated with the permanent reference electrode 22, chemical properties, temperature, pressure, moisture content, and/or other properties, as will be understood by a person skilled in the art.

Moreover, certain embodiments include one or more actuators to perform actions in response to receiving instructions from the controller 80, a user device, and/or a technician. In an embodiment, an actuator is operatively coupled to a fluid source of the test station 40, and may receive instructions from the controller 80 to provide fluid into the conduit 52. In response to the instructions, the actuator may open a valve or otherwise fluidly connect the fluid source to the conduit 52 to provide the fluid to the conduit 52, the cap 50, and the permanent reference electrode 22. In embodiments, any suitable actuators may be provided in the electrode watering system 10 to initiate changes for improved operation and maintenance of the permanent reference electrode 22.

The electrode watering assembly 20, in at least some embodiments, may be used for a variety of structures positioned in a variety of different environments. For example, on land the cathodically protected structure 26 may be a transmission pipeline or storage tank that is at least partially buried in the surrounding environment, such as the ground 30. One of skill in the art will appreciate that the design of an electrode watering assembly 20 may be at least partially influenced by characteristics associated with the intended surrounding environment, which are not meant to be limiting. Although most often referred to herein in the context of a structure 26 buried in soil or the ground 30, as shown in FIG. 1, the disclosed examples and methods may be used for any environment containing a structure that is subject to cathodic protection. Additionally, the examples discussed herein may refer primarily to permanent reference electrodes 22 and electrode watering assemblies 20 having generally circular shapes or cross-sections. However, the present techniques may be extended to embodiments having various cross-sections, including triangular, rectangular, or hexagonal, for example. Certain embodiments herein discuss the electrode watering assembly 20 with reference to receiving and directing water, though it should be understood that any suitable fluid for maintaining the operation of the permanent reference electrode 22 may be implemented, such as a solution, and electrolyte solution, a solvent, and/or a fluid.

Figure 2C:
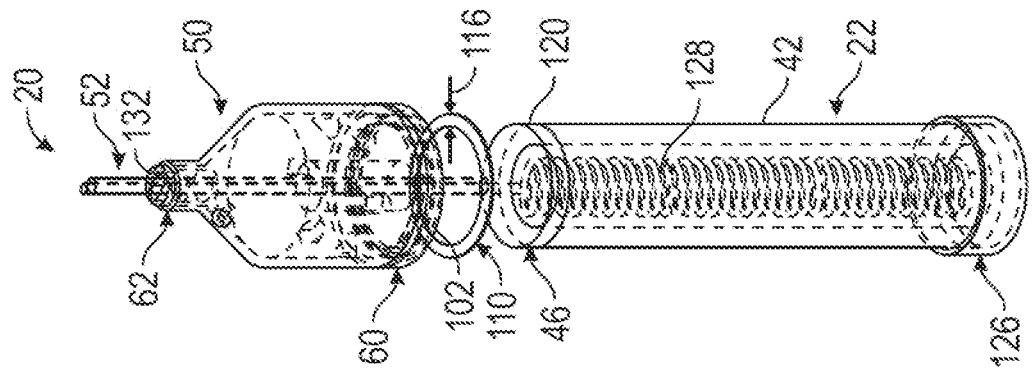
FIG. 2C is a schematic partially exploded perspective view of the example electrode watering assembly and example permanent reference electrode shown in FIG. 2A, according to embodiments of the disclosure.
Figure 2B:
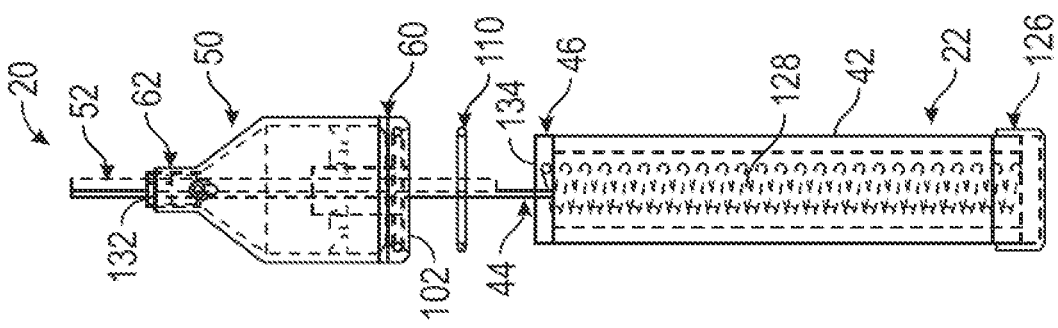
FIG. 2B is a schematic partially exploded side view of the example electrode watering assembly and example permanent reference electrode shown in FIG. 2A, according to embodiments of the disclosure.
Figure 2A:
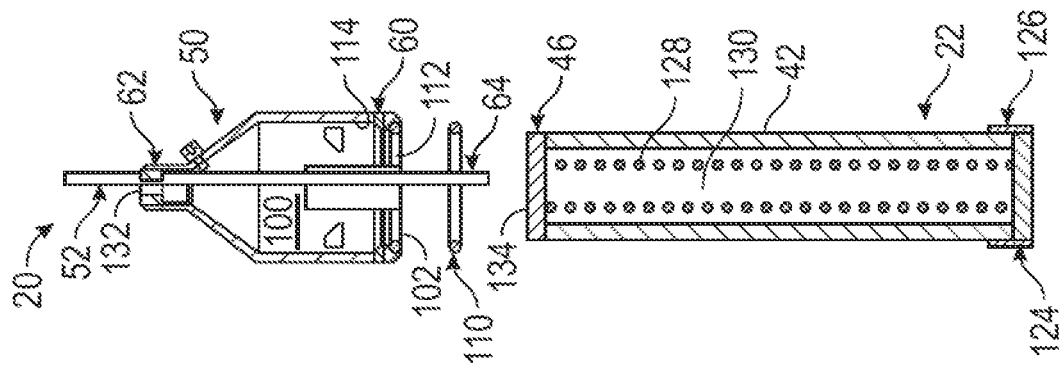
FIG. 2A is a schematic partially exploded cross-sectional view of an example electrode watering assembly for an example permanent reference electrode, according to embodiments of the disclosure.

FIGS. 2A, 2B, and 2C respectively illustrate schematic partially exploded cross-sectional, side, and perspective views of an example of an electrode watering assembly 20 for enhancing the usable lifetime of an example permanent reference electrode 22. As introduced above, the electrode watering assembly 20 may include a cap 50 having a distal cap end 60 for coupling to a proximal electrode end 46 of the permanent reference electrode 22, a proximal cap end 62 for receiving a distal conduit end 64 of the conduit 52, and a reservoir 100 defined between the distal cap end 60 and the proximal cap end 62. The distal cap end 60 includes a distal opening 102, which may be suitably sized and shaped for providing a close fit over the proximal electrode end 46 of the permanent reference electrode 22.

The electrode watering assembly 20 may further include one or more waterproof connectors or sealing elements to fluidly seal the distal cap end 60 and/or the proximal cap end 62 of the cap 50. For example, the sealing elements may include sealing elements such as a gasket 110, annular ring, or O-ring that is retained during operation within a recessed or receiving groove 112 defined within an inner surface 114 of the distal cap end 60. In some embodiments, the gasket 110 may be added to or retained within the receiving groove 112 prior to installation of the cap 50 on the permanent reference electrode 22, such as based on an interference fit or a suitable adhesive. The gasket 110 may be constructed of any suitably deformable material, such as silicone or rubber, to enable the formation of a waterproof seal between the cap 50 and the permanent reference electrode 22. The gasket 110 may include a thickness 116 (FIG. 2C) that is at least as large as an annular gap that may otherwise be formed based on a difference between diameters of the inner surface 114 of the cap 50 and an outer surface 120 of the permanent reference electrode 22. In certain embodiments, the sealing elements may additionally or alternatively include a heat shrink tape or material applied across outer surfaces of the cap 50 and the permanent reference electrode 22 at the junction therebetween. In some embodiments, the sealing elements may additionally or alternatively include epoxy, foam, and/or another suitable waterproof substance or sealant that is applied between the cap 50 and the permanent reference electrode 22 for fluidic sealing or formation of a waterproof seal.

In the illustrated embodiment, the permanent reference electrode 22 includes a body 42 having a plug 124 at a second or distal electrode end 126, opposite the proximal electrode end 46. The body 42 may include or be formed from one or more layers of suitable porous materials, such as ceramic and/or plastic materials. The permanent reference electrode 22 may also include a coiled electrode 128 that is in contact with an electrolyte compound 130 retained within the body 42. Certain embodiments may include a seal, such as epoxy, to facilitate retention of the coiled electrode 128 in the body 42. In some embodiments, the electrolyte compound 130 is provided with a solid-state form, a semi-solid form, and/or a gel-like form. In some embodiments, the electrolyte compound 130 may include copper sulfate, water, a solid filler, mixtures thereof, and/or similar materials or materials having similar electrolytic and/or gel-like characteristics, although other electrolytic materials are contemplated. Indeed, any suitable solid electrolyte compound or gel electrolyte compound may be provided as the electrolyte compound 130 of the permanent reference electrode 22. An electrical conductor 44 (FIG. 2B) may extend from the coiled electrode 128, through the distal opening 102, the reservoir 100, and a proximal opening 132 of the cap 50, and be coupled to the electrical system 38 at the test station 40. Accordingly, after the permanent reference electrode 22 is equipped with the electrode watering assembly 20 and positioned within the ground, water or fluid may be added through the conduit 52 and into the reservoir 100 of the cap 50 to efficiently rewet or moisten the electrolyte compound 130 of the permanent reference electrode 22. As such, the cap 50 is ideally positioned to retain or trap water within the reservoir 100 and against the proximal electrode end 46 and/or a proximal surface 134 (FIG. 2A) of the permanent reference electrode 22. In embodiments, the electrode watering assembly 20 also includes a sealing element provided around the proximal cap end 62 to fluidly seal any space between the cap 50, the electrical conductor 44, and the conduit 52 as the electrical conductor 44 and the conduit 52 traverse the proximal opening 132. The sealing element of the proximal cap end 62 may include a heat shrink tape or other suitable waterproof material, substance, or sealant, in certain embodiments.

As presently recognized, embodiments of the electrode watering assembly 20 disclosed herein provide a dual component water potential, or tendency of water movement, toward watering the electrolyte compound 130. For example, water may be driven into the electrolyte solution based on (i) diffusion moving water particles from a higher concentration within the reservoir 100 to a lower concentration within the electrolyte compound 130, and (ii) gravity applying downward force on water within the reservoir 100. These driving forces may cooperate to efficiently maintain a target moisture content within the electrolyte compound 130 for improved maintenance and operation of the permanent reference electrode 22.

FIGS. 3A, 3B, and 3C respectively illustrate schematic cross-sectional, side, and perspective views of an example cap 50 of the example electrode watering assembly 20 that provides enhanced maintenance for permanent reference electrodes. The illustrated embodiment of the cap 50 includes a cap body 200 with three main sections defined in sequence along a longitudinal axis 202: a distal tubular section 210, a shoulder section 212, and a proximal tubular section 214. In embodiments, the distal tubular section 210 includes a first inner diameter 216, the proximal tubular section 214 includes a second inner diameter 218, and the shoulder section 212 includes a varied diameter that slopes between the first inner diameter 216 and the second inner diameter 218. Although illustrated with the shoulder section 212 having a generally uniformly sloped wall, other embodiments of the shoulder section 212 may include a non-constant slope that forms a curved wall. The cap body 200 of the cap 50 may be formed from a resilient, waterproof material, such as plastic or resin, via a corresponding manufacturing process that may include injection molding and/or 3D printing, in certain embodiments.

The cap body 200 is shown as a hollow part having an open volume therein that defines a reservoir 100 for receiving water from the conduit, in certain embodiments. The reservoir 100 is sized to retain a desired amount of water suitable for rewetting the electrolyte compound and improving operation of an associated permanent reference electrode. In certain embodiments, a volume of the reservoir 100 may be calculated and constructed based on the physical dimensions and/or chemical components of the permanent reference electrode. For example, the reservoir 100 may be provided with a volume of 10 mL, 25 mL, 50 mL, 100 mL, 150 mL, 200 mL, 500 mL, and so forth. In some embodiments, the reservoir 100 may include a volume for providing a suitable store of water for at least partially persisting atop the permanent reference electrode for a predetermined threshold time, such as 1 hour, 12 hours, 24 hours, 1 week, 1 month, and so forth. The reservoir 100 may significantly improve maintenance operations for the permanent reference electrode, compared to any other rewetting process, by providing in-situ, targeted rewetting of the electrolyte compound for a prolonged period of time, based on a single application of water to the conduit at an above-ground test station.

Looking to more details of the cap body 200, the distal tubular section 210 thereof is generally sized and shaped to couple to, and retain water against, the proximal electrode end of the permanent reference electrode discussed above. As such, the distal tubular section 210 includes a distal opening 102, such as the illustrated distal opening 102 having a circular shape, defined therethrough. An inner surface 114 of the distal tubular section 210 may further include a receiving groove 112 defined therein to facilitate positioning of a sealing element within the cap 50, as discussed above. In certain embodiments, the inner surface 114 of the distal tubular section 210 may snap-fit over the permanent reference electrode, such as based on the receiving groove 112 and a gasket thereof providing a restricted diameter into which a circumferential lip of the proximal electrode end may be snapped through and retained.

In certain embodiments, the inner surface 114 of the distal tubular section 210 may also include one or more positioning protrusions 230 or guides having a suitable shape for guiding manual or automated placement of the cap 50 over the permanent reference electrode. For example, an assembler may push the cap 50 over the permanent reference electrode 22 until a distal surface 232 of the one or more positioning protrusions 230 engages with or abuts a proximal surface of the permanent reference electrode. The one or more positioning protrusions 230 may be separated from a distal surface 234 of the distal tubular section 210 by a predetermined distance 236 along the longitudinal axis 202, in certain embodiments, thus ensuring the permanent reference electrode may be reliably guided into the cap 50 by a distance generally equal to the predetermined distance 236.

Additionally, the illustrated embodiment of the cap 50 includes six discrete positioning protrusions 230 or guides that are equally distributed along the circumference of the inner surface 114, which may be defined along a circumferential axis 240. In embodiments, any suitable number of positioning protrusions 230 may be provided in any suitable arrangement, including equal or unequal distributions along the circumference of the inner surface 114. Additionally, when constructed as discrete elements separated by circumferential spaces, the positioning protrusions 230 may occupy less volume within the cap 50 than continuous protrusions extending across a longer portion of the inner circumference of the distal tubular section 210. As such, for a given size of the cap 50, the increased open volume provided by the tapered and/or discrete positioning protrusions 230 may contribute to an increased capacity for the reservoir 100 therein to retain water, while further providing a reliable assembly guide for uniform, accurate placement of the cap 50.

Moreover, the proximal surface of certain permanent reference electrodes may be sealed with epoxy or another suitable material, which may reduce or prevent fluid flow into the proximal surface. In some embodiments, one or more circumferential gaps, which are defined between the discrete or circumferentially spaced positioning protrusions 230, thus provide one or more flow paths for efficient direction of fluid past the sealed proximal surface and into a side surface of the permanent reference electrode for rewetting. In some embodiments, the distal tubular section 210 may include a single positioning protrusion 230 that extends around all or a portion of the circumference of the inner surface 114, provided that an opening or gap is defined through the single positioning protrusion 230 to enable fluid flow to access an unsealed surface of the permanent reference electrode 22, such as a side surface.

In certain embodiments, the positioning protrusions 230 may include an angled or tapered shape or cross-section, such as the cross-section of a right triangle or an irregular quadrilateral with one or more right angles. An amount of open space within the cap 50 may be increased based on the tapering of the positioning protrusions 230, compared to non-tapered protrusions. In some embodiments, the angled or tapered shape improves an ease of manufacturing the cap 50, such as via 3D printing or injection molding.

Moving along the cap body 200, the shoulder section 212 may be integrally formed between the distal tubular section 210 and the proximal tubular section 214 to transition between the respective inner diameters 216, 218 thereof. The shoulder section 212 of the illustrated embodiment also includes an overflow port 250 that traverses the cap body 200, thereby providing an outlet for excess fluid directed into the reservoir 100 to flow therefrom. For example, the electrode watering assembly 20 may be generally waterproof or sealed at every point distal to or downstream of the proximal conduit end of the conduit. As such, the overflow port 250 of certain embodiments enables the electrode watering assembly 20 to release an amount of water or overflow fluid, in excess of an expected amount usable for electrolyte rewetting, that may otherwise stagnate within the cap 50 or the conduit coupled thereto. In certain embodiments, the overflow port 250 may desirably direct a portion of water to the soil or filler surrounding the permanent reference electrode. Moreover, the overflow port 250 of certain embodiments may facilitate venting of gases produced during operation of the permanent reference electrode. Other embodiments for wetting the ground and/or venting gasses are discussed below. In embodiments, the proximal tubular section 214 may include an overflow port 250 in addition or in alternative to the shoulder section 212.

Further, the proximal tubular section 214 includes the proximal opening 132 for directing the electrical conductor from the permanent reference electrode and for receiving the distal conduit end of the conduit. As such, the inner diameter 216 of the proximal tubular section 214 may be smaller than the inner diameter 218 of the distal tubular section 210 to approach the cumulative size of the electrical conductor and the conduit more closely. That is, certain embodiments of the proximal opening 132 include a smaller open area than the distal opening 102 of the cap 50. In the illustrated embodiment, the proximal opening 132 has an elliptical shape or an oval shape that may be specifically suitable for receiving two tubular components. For example, the elliptical shape of the proximal opening 132 may include two, adjacent focal points for receiving the electrical conductor and the conduit, respectively. As another example, the proximal opening 132 may include an open width and an open length that is larger than the open width. This construction may improve the ability of the proximal tubular section 214 to be sealed with a sealing element discussed above with reference to FIGS. 2A-2C, such as heat shrink tape.

Figure 4B:
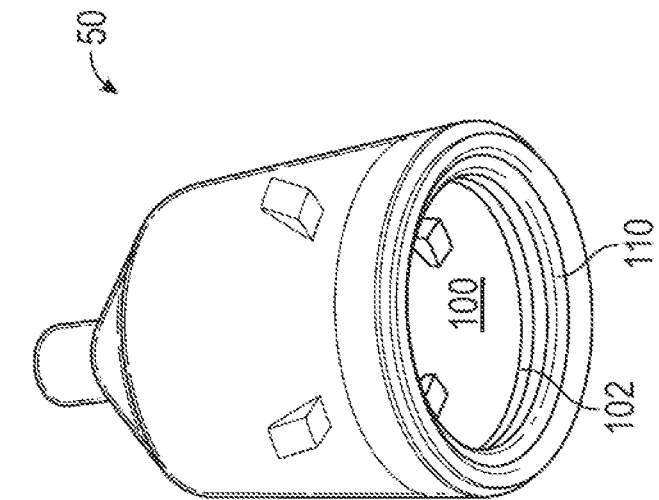
FIG. 4B is a bottom perspective view of the example cap assembly of FIG. 4A, according to embodiments of the disclosure.
Figure 4A:
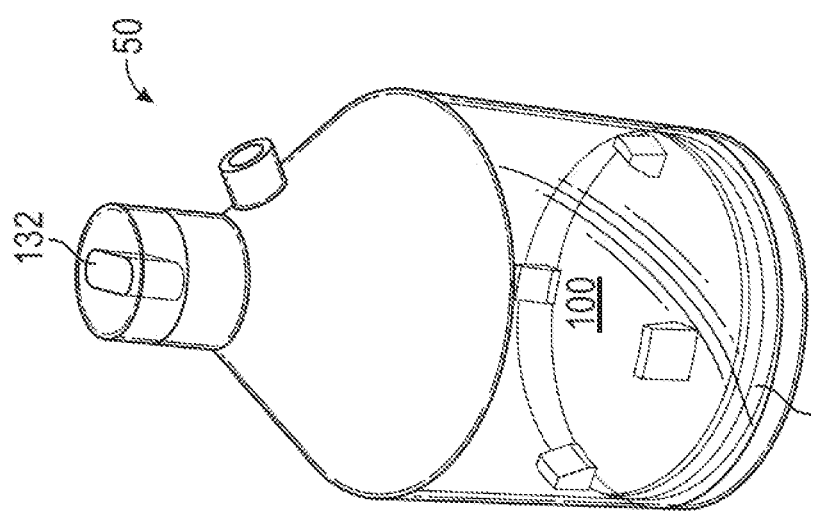
FIG. 4A is a top perspective view of an example cap assembly having a cap and a gasket, according to embodiments of the disclosure.

FIGS. 4A and 4B are top and bottom perspective views, respectively, of an example cap assembly 270 having a cap 50 and a gasket 110. In the illustrated embodiment, the cap 50 is formed of a translucent plastic material, which may provide visibility to a reservoir 100 and any water therein. This visibility may be leveraged during testing procedures in which water is added to the reservoir 100 and an associated electrode watering assembly is tested for leaks and/or performance. The gasket 110 may be placed within the cap 50 before installation of the cap 50 onto the permanent reference electrode, in certain embodiments. The cap 50 also includes a distal opening 102 and a proximal opening 132, having a circular shape and an elliptical shape, respectively.

Figure 5A:
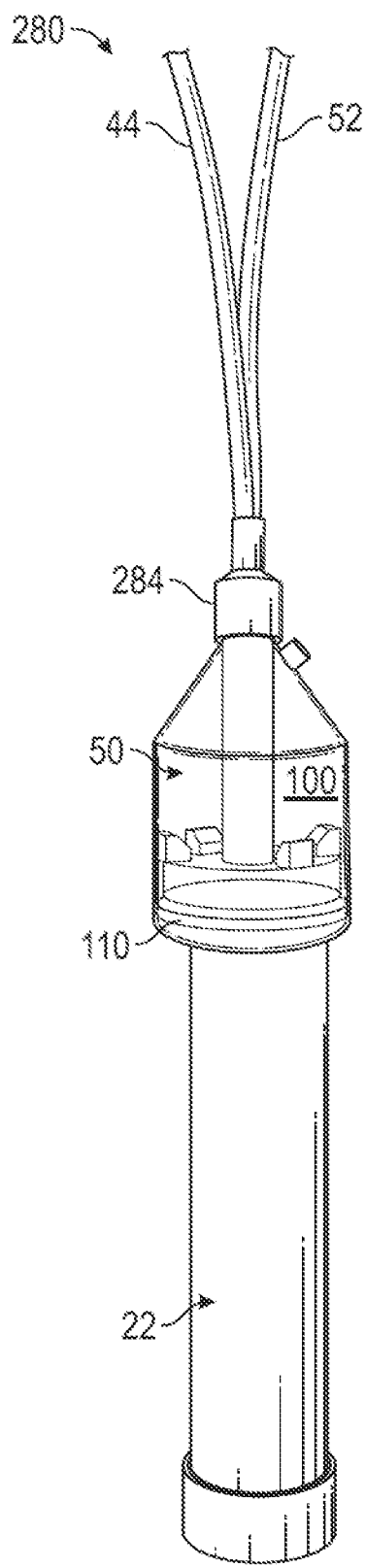
FIG. 5A is a side perspective view of an example electrode watering assembly installed on an example permanent reference electrode and including an empty reservoir, according to embodiments of the disclosure.
Figure 5B:
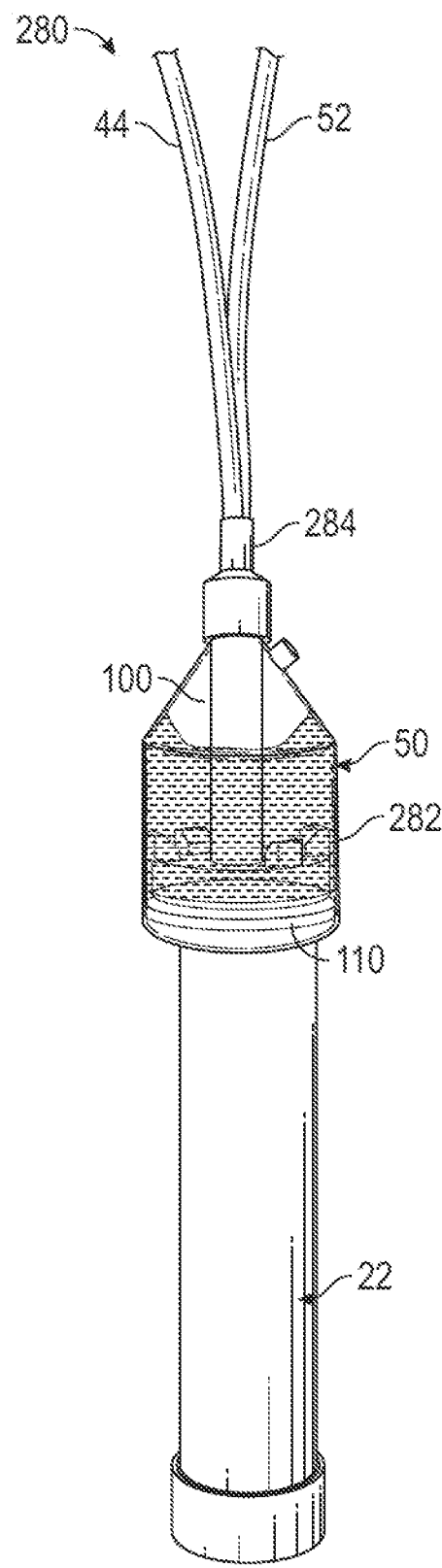
FIG. 5B is a side perspective view of the example electrode watering assembly of FIG. 5A having the reservoir filled with fluid, according to embodiments of the disclosure.

FIG. 5A is a side perspective view of an example electrode watering assembly 280 installed on an example permanent reference electrode 22 and including an empty reservoir 100. FIG. 5B is a side perspective view of the example electrode watering assembly 280 having the reservoir 100 filled with fluid 282. As shown, the electrode watering assembly 280 includes a cap 50 positioned on the permanent reference electrode 22, a conduit 52 coupled to the cap 50, and an electrical conductor 44 extending from the permanent reference electrode 22, through the cap 50, and then adjacent to the conduit 52. A gasket 110 is illustrated within the cap 50 to provide a waterproof seal between the cap 50 and the permanent reference electrode 22. Additionally, a sealing element 284 is provided around a junction between the cap 50, the electrical conductor 44, and the conduit 52. The fluid 282 added to a reservoir 100 within the cap 50 may therefore persist for a time period above and in contact with the permanent reference electrode 22 to maintain operation of the electrolyte compound therein.

Figure 6:
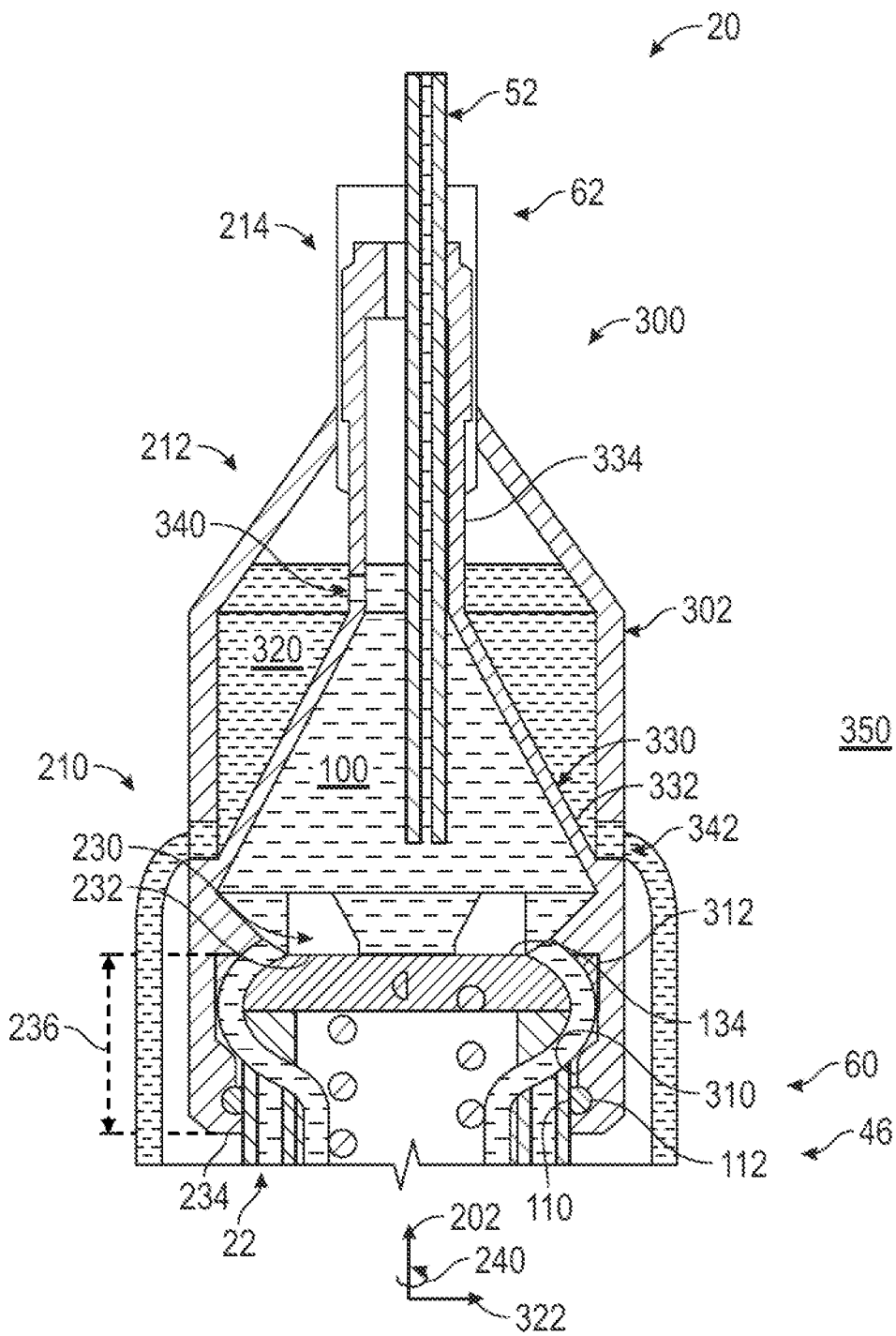
FIG. 6 is a schematic cross-sectional view of an example electrode watering assembly installed on an example permanent reference electrode and having a dual chambered cap, according to embodiments of the disclosure.

FIG. 6 is a schematic cross-sectional view of an example electrode watering assembly 20 installed on an example permanent reference electrode 22. The electrode watering assembly 20 is illustrated as including a conduit 52, a gasket 110, and a dual chambered cap 300, each within a respective installed position. In certain embodiments, the dual chambered cap 300 includes all or a portion of the functionality of the cap 50 discussed above. For example, an outer wall 302 of the dual chambered cap 300 may include a distal tubular section 210, a shoulder section 212, and a proximal tubular section 214. The gasket 110 may be retained within a receiving groove 112 of the distal tubular section 210 to enhancing sealing between the dual chambered cap 300 and a proximal electrode end 46 of the permanent reference electrode 22. Additionally, certain embodiments include the positioning protrusions 230 defined on an inner surface 114 of the distal tubular section 210. In the illustrated installed position, a distal surface 232 of the positioning protrusions 230 is in physical contact or abuts a proximal surface 134 of the permanent reference electrode 22. A predetermined distance 236 along a longitudinal axis 202 between the distal surface 232 of the positioning protrusions 230 and a distal surface 234 of the distal tubular section 210 may therefore be utilized to reliably establish a target insertion depth of the permanent reference electrode 22 into the dual chambered cap 300, in certain embodiments. Moreover, certain embodiments include snap-fit fasteners on the inner surface 114 of the distal tubular section 210 and the permanent reference electrode 22, such as a restricted diameter 310 of the dual chambered cap 300 that snaps overs a circumferential lip 312 of the permanent reference electrode 22.

Similar to the above discussion, the dual chambered cap 300 may include a reservoir 100 that retains a volume of water against the proximal surface 134 of the permanent reference electrode 22. Additionally, the present embodiment of the dual chambered cap 300 includes an annular channel 320 that is at least partially overlapped with the reservoir 100 along a radial axis 322 and a longitudinal axis 202. In embodiments, the annular channel 320 may overlap with the reservoir 100 along the radial axis 322, the longitudinal axis 202, or both. The overlapping may provide a more compact form factor to the electrode watering assembly 20, compared to assemblies with less overlapping. Additionally, the annular channel 320 of certain embodiments may be at least partially offset from the reservoir 100 along the radial axis 322, such that the reservoir 100 occupies a centermost space within the dual chambered cap 300. A divider wall 330, baffle, or internal barrier extends from the inner surface of the distal tubular section 210 and to the proximal tubular section 214 of the cap body 200, in certain embodiments. The divider wall 330 may include any suitable shape for channeling water, such as the illustrated shape having a constant slope portion 332 that transitions into an upright neck portion 334.

In embodiments, one or more inner apertures 340 may be formed through the divider wall 330 to fluidly connect an upstream portion of the reservoir 100 to the annular channel 320. In certain embodiments, the inner aperture 340 is positioned at a proximal portion of the divider wall 330 relative to the longitudinal axis 202 to provide a sufficient volume to the reservoir 100. Additionally, certain embodiments include one or more outer apertures 342 formed through the outer wall 302 of the dual chambered cap 300. The outer aperture 342 may be positioned at a distalmost position of the annular channel 320 relative to the longitudinal axis 202, thus reducing an opportunity for stagnation within the annular channel 320. In other words, certain embodiments of the annular channel 320 do not retain water therein, instead directing the water through the outer aperture 342 via gravity. Moreover, in certain embodiments, the outer aperture 342 may release vented gasses from the reservoir 100 by permitting venting and displacement of air to allow for water flow.

Looking now to water flow paths through the electrode watering assembly 20, water may be initially provided into the electrode watering assembly 20 through the conduit 52 and travel into the reservoir 100 that is fluidly coupled to the conduit 52. As discussed above, water within the reservoir 100 may therefore rewet the electrolyte compound 130 of the permanent reference electrode 22. In embodiments, in response to a threshold volume of water filling the reservoir 100, water may flow through the inner aperture 340 of the divider wall 330 and into the annular channel 320. This overflow of water may further travel to the outer aperture 342 of the outer wall 302 and into a surrounding environment 350 of soil or filler. Accordingly, the dual chambered cap 300 may provide moisture to the surrounding environment 350 for improving or maintaining a reliability of measurements taken via the permanent reference electrode 22 installed in the surrounding environment 350, while simultaneously rewetting the electrolyte compound 130 fluidly connected to the reservoir 100. Indeed, the dual chambered cap 300 including embodiments of the reservoir 100 and the annular channel 320 described herein may provide two, partially overlapped water flow paths: a first flow path from the conduit 52, into the reservoir 100, and into the electrolyte compound 130, and a second flow path from the conduit 52, into the reservoir 100, into the annular channel 320, and into the surrounding environment 350.

Figure 7C:
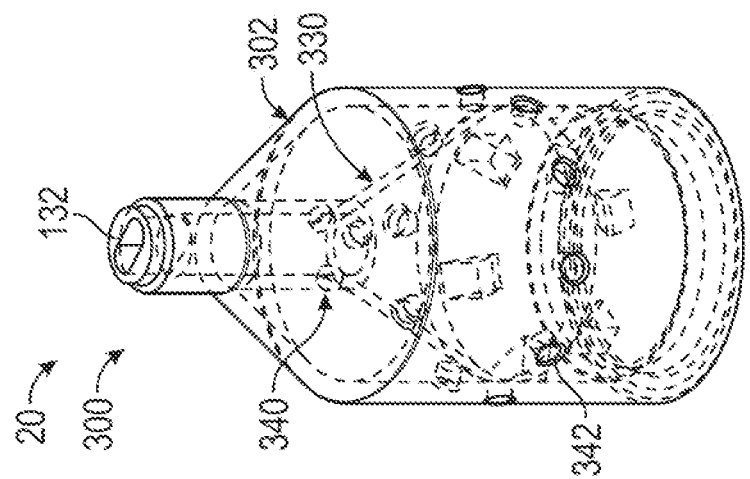
FIG. 7C is a schematic perspective view of the example dual chambered cap shown in FIG. 7A, according to embodiments of the disclosure.
Figure 7B:
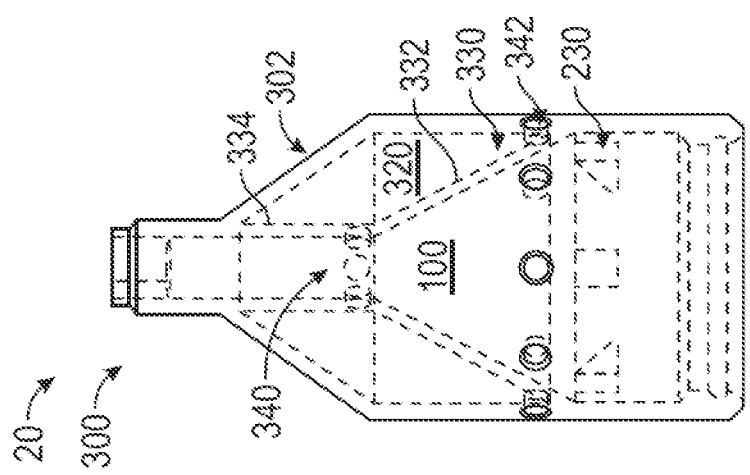
FIG. 7B is a schematic side view of the example dual chambered cap shown in FIG. 7A, according to embodiments of the disclosure.
Figure 7A:
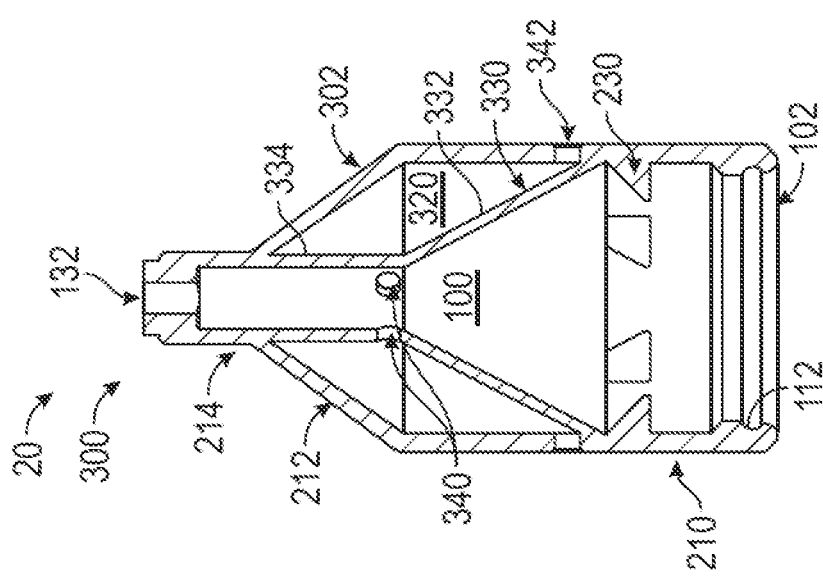
FIG. 7A is a schematic cross-sectional view of an example dual chambered cap of the example electrode watering assembly shown in FIG. 6, according to embodiments of the disclosure.

FIGS. 7A, 7B, and 7C respectively illustrate schematic cross-sectional, side, and perspective views of an example dual chambered cap 300 of the example electrode watering assembly 20. As discussed above, the dual chambered cap 300 may include the reservoir 100 and the annular channel 320 for receiving and directing fluid to the permanent reference electrode and its surrounding environment. The dual chambered cap 300 includes the outer wall 302 having the distal tubular section 210, the shoulder section 212, and the proximal tubular section 214. The distal tubular section 210 includes the distal opening 102 therethrough for receiving and coupling to the permanent reference electrode and the proximal tubular section 214 includes the proximal opening 132 therethrough for receiving and coupling to the electrical conductor and/or the conduit. The proximal opening 132 of certain embodiments includes an oval shape (FIG. 7C) to reduce an open space between the dual chambered cap 300, the electrical conductor, and the conduit.

The dual chambered cap 300 also includes the divider wall 330 positioned to separate the reservoir 100 from the annular channel 320. The divider wall 330 of certain embodiments includes an upright neck portion 334 and a constant slope portion 332, though other suitable shapes may be provided. In some embodiments, a slope or angle of the divider wall 330 may be substantially similar to a slope or angle of the shoulder section 212. As discussed above, the divider wall 330 may include one or more inner apertures 340 formed therethrough to fluidly connect an upstream portion of the reservoir 100 to the annular channel 320. Moreover, the outer wall 302 may include one or more outer apertures 342 formed therethrough to fluidly connect a downstream portion of the annular channel 320 to the environment. In the illustrated embodiment, the dual chambered cap 300 includes three inner apertures 340 and six outer apertures 342 (FIG. 7C) evenly distributed across respective circumferences of the upright neck portion 334 of the divider wall 330 and the distal tubular section 210 of the outer wall 302. By evenly distributing the apertures 340, 342, the dual chambered cap 300 may provide reliable flow of fluid to the annular channel 320 and thus the surrounding environment. In embodiments, any suitable number of apertures may be provided in any shape or configuration that enables sufficient fluid flow.

Accordingly, the dual chambered cap 300 desirably includes two, partially overlapped water flow paths: a first flow path from the conduit 52, into the reservoir 100, and to the permanent reference electrode, and a second flow path from the conduit 52, into the reservoir 100, into the annular channel 320, and into material surrounding the permanent reference electrode. In embodiments, the dual chambered cap 300 also includes the receiving groove 112 for receiving the gasket discussed above, as well as the positioning protrusions 230 to facilitate positioning of the dual chambered cap 300 in a target position over the permanent reference electrode.

Figure 8B:
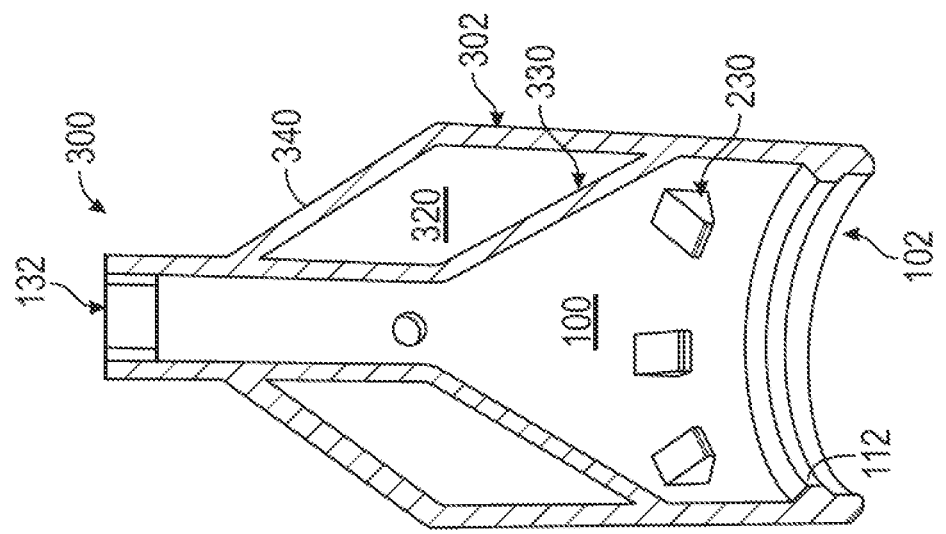
FIG. 8B is a side cutaway view of the example dual chambered cap of FIG. 8A, according to embodiments of the disclosure.
Figure 8A:
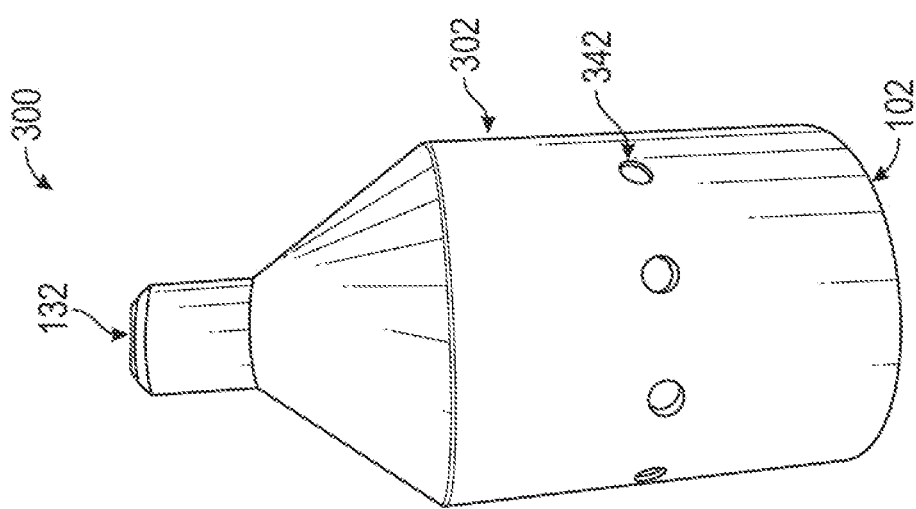
FIG. 8A is a side perspective view of an example dual chambered cap, according to embodiments of the disclosure.

FIGS. 8A and 8B further illustrate additional views of an example dual chambered cap 300, such as a side perspective view and a side cutaway view, respectively. In the illustrated embodiment, the dual chambered cap 300 includes the reservoir 100 and the annular channel 320 positioned longitudinally between the distal opening 102 and the proximal opening 132, which respectively include a circular shape and an elliptical shape. The divider wall 330 includes inner apertures 340 to provide a flow path between the reservoir 100 and the annular channel 320. Additionally, the outer wall 302 includes the outer apertures 342 to provide a flow path between the annular channel 320 and the surrounding environment. Certain embodiments of the dual chambered cap 300 also include the receiving groove 112 and the positioning protrusions 230 discussed above.

Figure 9C:
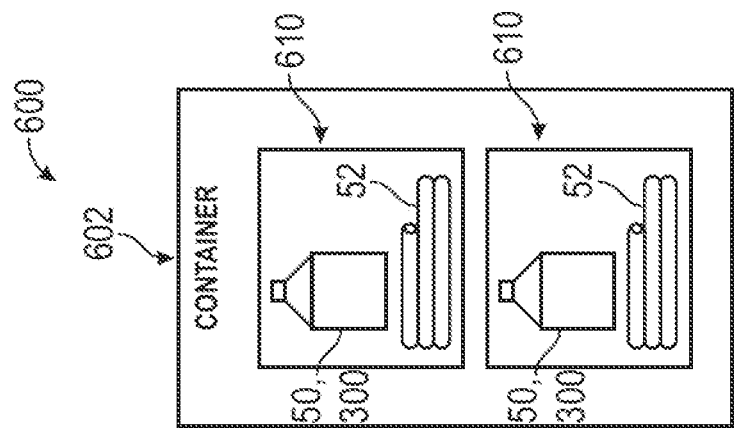
FIG. 9C is a schematic diagram of another example kit to facilitate installation of an electrode watering assembly, according to embodiments of the disclosure.
Figure 9B:
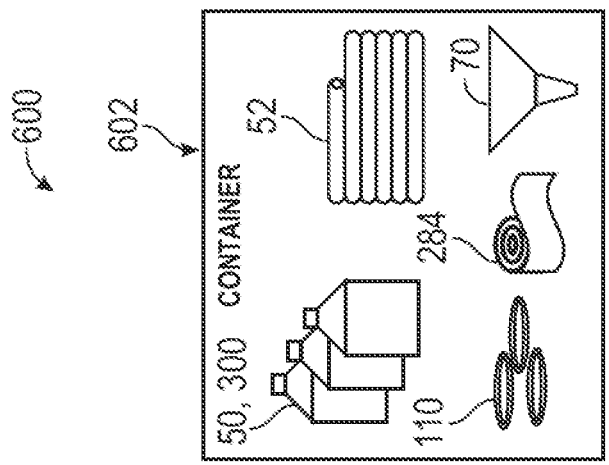
FIG. 9B is a schematic diagram of another example kit to facilitate installation of an electrode watering assembly, according to embodiments of the disclosure.
Figure 9A:
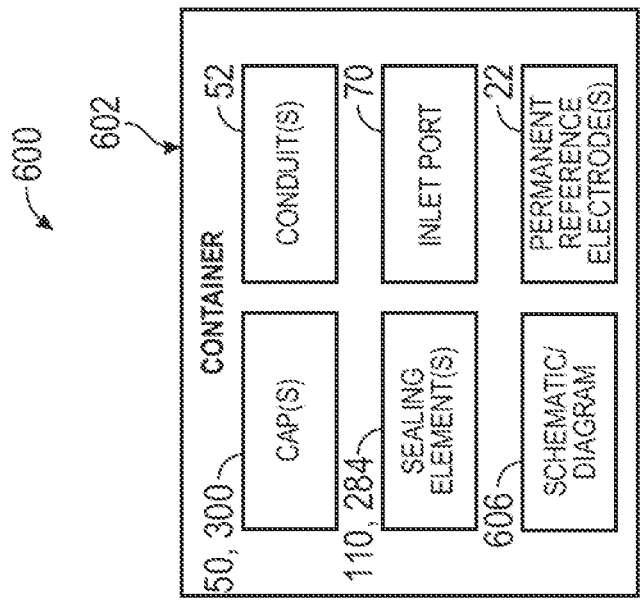
FIG. 9A is a schematic diagram of an example kit to facilitate installation of an electrode watering assembly, according to embodiments of the disclosure.

FIGS. 9A-9C illustrate certain embodiments of kits 600 that may be used for the installation of the electrode watering assembly 20. For example, in some embodiments, one or more components of the electrode watering assembly 20 may be transported to and about a worksite (such as the site associated with the structure 26 of FIG. 1) in a container 602 as a single kit 600 or assembly. In some embodiments, the kit 600 may facilitate providing at least a target moisture content within and/or around permanent reference electrodes for improved permanent reference electrode maintenance, operation, and reliability.

As shown in FIG. 9A, in some embodiments, the kit 600 may include one or more components of an electrode watering assembly 20. As such, the kit 600 may be used for installing or retrofitting a permanent reference electrode with the capabilities of the electrode watering assembly 20 described herein, including in-situ watering or remoistening of electrolyte material within the permanent reference electrode and/or surrounding material external to the permanent reference electrode. Thus, in some embodiments, the kit 600 may include one or more components of the electrode watering assembly 20, including caps 50, 300, conduits 52, sealing elements 110, 284, permanent reference electrodes 22, and inlet ports 70. For example, the kit 600 may include one or more single chambered caps 50, one or more dual chambered caps 300, or a combination of both, in certain embodiments. In some embodiments, the caps 50, 300 may be provided in multiple sizes or diameters to suit installation on permanent reference electrodes 22 of varying size. The kit 600 of some embodiments includes one or more conduits 52 to be fluidly coupled to the caps 50, 300. The one or more conduits 52 may be provided in a single length that is readily segmented or cut to pieces having individualized target lengths, in some embodiments. In some embodiments, the kit 600 includes multiple, pre-cut conduits 52 in one or more commonly utilized lengths.

The kit 600 may also include sealing elements, such as one or more gaskets 110, one or more sealing elements 284, or a combination of both. In some embodiments, the sealing elements 284 include the heat shrink material or tape discussed above. The gaskets 110 and/or the sealing elements 284 may facilitate fluidic sealing of various junctions associated with the electrode watering assembly 20, including between the permanent reference electrode and the associated cap, between the cap and the conduit and/or electrical conductor, and/or between the conduit and any above-ground component to which the conduit may be coupled. In embodiments, the kit 600 includes one or more gaskets 110 for each cap 50, 300 of the kit. The gasket 110 of certain embodiments may be provided in a pre-installed configuration within the receiving groove of corresponding caps. In embodiments, the sealing elements 284 may be provided as individual, heat shrink tubes, as a roll of heat shrink tape that may be cut to desired sizes, or in another suitable format. Additionally, the kit 600 of certain embodiments may include one or more permanent reference electrodes 22, which may have electrical conductors, as discussed above.

The kit 600 may also include an inlet port 70 to be positioned at a test station. In embodiments, the inlet port 70 may be fixed permanently at the test station or alternatively, carried with the technician during maintenance operations. In some embodiments, the kit 600 may also include other features for supplying water to the conduit 52 at the test station, such as a retainment cap, pressurized vessel or water source, and so forth. In some embodiments, the kit 600 may also include additional components to facilitate installation and/or use of electrode watering assembly. For instance, in some embodiments, the container 602 of the kit 600 may include a schematic or diagram 606 for installing or assembling the electrode watering assembly or a component or subassembly thereof.

The kit 600 may include any suitable combination of these or other appropriate components. For example, in some embodiments, the kit 600 may include fewer or additional components than those shown in FIG. 9A. As one specific example embodiment, FIG. 9B includes three caps 50, 300, three gaskets 110, a conduit 52, a sealing element 284, and an inlet port 70, each positioned within the container 602. The inlet port 70 is illustrated in the present embodiment as a funnel. Additionally, the conduit 52 is illustrated as a single length or roll and may be portioned into multiple conduits 52 of one or more target lengths. Similarly, in the illustrated embodiment, the sealing element 284 is a roll of heat shrink tape that may be portioned and provided to seal a connection between a cap 50, 300 and a corresponding conduit 52. As such, the kit 600 of FIG. 9B may be utilized to efficiently install caps 50, 300 and conduits 52 on three corresponding permanent reference electrodes.

As another example, FIG. 9C illustrates the container 602 having two sub-containers 610 positioned in the container 602. For example, in some embodiments, the container 602 may include a box or bag, and the sub-containers 610 may include a smaller box or bag within the container 602. Each sub-container 610 is illustrated as including a cap 50, 300 and a conduit 52 therein. As such, each sub-container 610 may correspond to a watering assembly for retrofitting an individual permanent reference electrode with in-situ watering capability. Moreover, it should be appreciated that other combinations of components are contemplated for the kit 600 in other embodiments.

Figure 10:
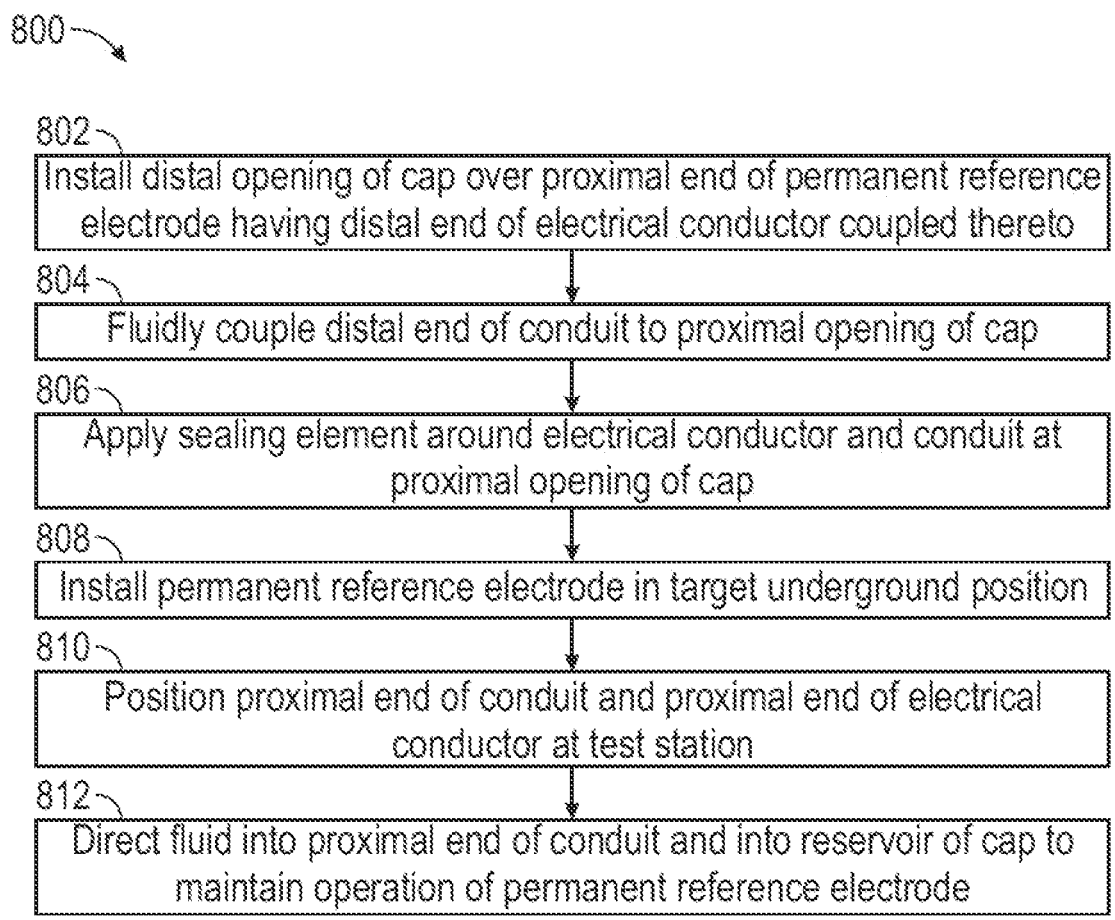
FIG. 10 is a block diagram of an example method for installing an electrode watering assembly, according to embodiments of the disclosure.

FIG. 10 is a block diagram of an example method 800 for installing an electrode watering assembly, according to embodiments of the disclosure, such as those described herein, as well as others. The example method 800 is illustrated as a collection of blocks in a logical flow graph, which represents a sequence of operations. The order in which the operations are described is not intended to be construed as a limitation, and any number of the described blocks may be combined in any order and/or in parallel to implement the method 800.

In embodiments, an electrode watering assembly 20 may include a conduit 52 and a cap 50 or dual chambered cap 300 provided to improve operation of a permanent reference electrode 22. In some embodiments, the electrode watering assembly 20 may be retrofit onto a previously provided or purchased permanent reference electrode 22. However, the components of the electrode watering assembly 20 and the permanent reference electrode 22 may be provided and assembled in any suitable order. An example for installing the electrode watering assembly 20 is discussed below based on an example scenario in which the components of the electrode watering assembly 20, including a cap 50, 300, a conduit 52, and the permanent reference electrode 22, having an electrical conductor extending therefrom, are already provided and accessible to an assembler. In some embodiments, providing the cap 50, 300 includes comprises 3D printing or injection molding a cap body thereof from a suitable rigid material, such as plastic or resin.

At block 802, the example method 800 includes installing a distal opening of the cap over a proximal electrode end of the permanent reference electrode, which includes a distal conductor end of an electrical conductor coupled thereto. For example, in certain embodiments, a proximal conductor end of the electrical conductor coupled to or integral with the permanent reference electrode may be threaded through the cap, which may then be moved or slid along a length of the electrical conductor until the cap is coupled to the permanent reference electrode. In some embodiments, the electrical conductor may be initially provided separate from the permanent reference electrode, and the cap may be coupled to the permanent reference electrode by inserting the distal conductor end of the electrical conductor through the cap, coupling the electrical conductor to the permanent reference electrode, and then coupling the cap to the permanent reference electrode.

At block 804, the example method 800 includes fluidly coupling a distal conduit end of a conduit to a proximal opening of the cap. For example, the conduit may be fluidly coupled to the cap by inserting the distal conduit end into the proximal opening by at least a threshold distance, in certain embodiments. At block 806, the example method 800 includes applying a sealing element around the electrical conductor and the conduit at the proximal opening of the cap. As discussed above, the sealing element of certain embodiments may include a heat shrink tape or tube, which may be heated until a desired, reduced size of the heat shrink tape is formed and seals the proximal opening of the cap.

At block 808, the example method 800 includes installing the permanent reference electrode in a target underground position, with the cap and the conduit coupled to the proximal electrode end of the permanent reference electrode. At block 810, the example method 800 includes positioning a proximal conduit end of the conduit and the proximal conductor end of the electrical conductor at a test station. In some embodiments, the proximal conduit end and the proximal conductor end may be positioned at the test station before the permanent reference electrode is placed in the target underground position. Certain embodiments include maintaining a close proximity between the conduit and electrical conductor such that they extend generally parallel with one another throughout all or a majority of an underground distance covered by the conduit and the electrical conductor. The conduit and electrical conductor may be in contact with one another or fixed together via fasteners such as cable ties, in some embodiments.

At block 812, the example method 800 includes directing fluid into the proximal end of conduit and into a reservoir of the cap to maintain operation of the permanent reference electrode. As discussed above, the cap of certain embodiments also includes an annular channel that is fluidly coupled to the surrounding environment for moistening soil or filler in which the permanent reference electrode is installed. In certain embodiments, the methods and assemblies disclosed herein enable in-situ, targeted rewetting of electrolyte within permanent reference electrodes from maintenance operations that are easily performed at an above-ground test station.

Figure 11:
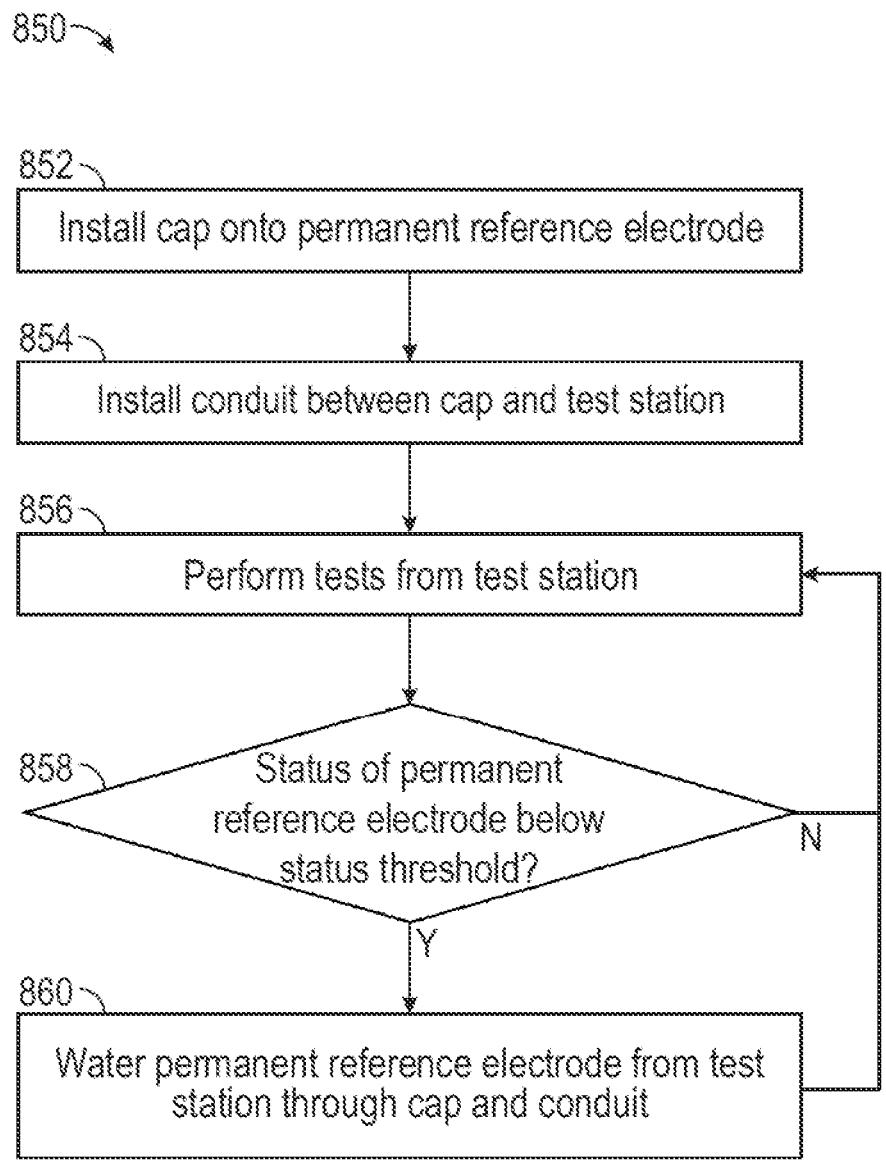
FIG. 11 is a block diagram of an example method for installation and use of an electrode watering assembly, according to embodiments of the disclosure.

FIG. 11 is a block diagram of an example method 850 for installation and use of an electrode watering assembly, according to embodiments of the disclosure, such as those described herein, as well as others. The example method 850 is illustrated as a collection of blocks in a logical flow graph, which represents a sequence of operations. The order in which the operations are described is not intended to be construed as a limitation, and any number of the described blocks may be combined in any order and/or in parallel to implement the method 850. Additionally, certain embodiments include a controller having a processor to perform all or a portion of the steps of example method 850.

At block 852, the example method 850 includes installing a cap of an electrode watering assembly onto a permanent reference electrode. As discussed above, the cap may include one or more chambers, such as the reservoir or the reservoir and the annular chamber. In some embodiments, the cap may be passed or threaded over an electrical conductor protruding from the permanent reference electrode until the cap is positioned over an end of the permanent reference electrode. The cap may thus be placed in a target position to provide the reservoir in close proximity to the electrolyte compound of the permanent reference electrode.

At block 854, the example method 850 includes installing a conduit between the cap and a test station, such as an above-ground test station used for monitoring cathodic protection. As discussed above, junctions between various components of the electrode watering assembly may be sealed via any suitable components, such as gaskets and/or heat shrink material. In certain embodiments, a controller may be provided to control assembly and/or operation of the electrode watering assembly. The controller may be the controller 80 described with reference to FIG. 1 above and further described below, a separate manufacturing controller, or any other suitable control device. In some embodiments, the controller may instruct one or more actuators, robotic arms, or assembly line devices to pre-install the cap and/or the conduit with the permanent reference electrode before the permanent reference electrode is positioned underground.

At block 856, the example method 850 includes performing one or more tests from the test station. In embodiments, performing the tests includes measuring a voltage of the permanent reference electrode via a voltage measuring device. The measurements taken based on the permanent reference electrode may be used to verify or evaluate the cathodic protection of the structure. In some embodiments, the tests may facilitate identification of any decrease in accuracy or quality of the measurements of the permanent reference electrode. In such cases and/or preemptively at regular intervals, the permanent reference electrode may be efficiently rewetted with the electrode watering assembly.

In embodiments, the one or more tests may be performed based on instructions from a controller, such as the controller 80 described with reference to FIG. 1 above. Additionally, the controller may provide instructions to perform tests to any suitable sensors of the electrode watering system, such as the voltage measuring device, a moisture sensor, and so forth. For example, the controller of certain embodiments may provide instructions to cause the voltage measuring device to measure a voltage of the permanent reference electrode and transmit data indicative of the measurements to the controller. In some embodiments, the controller may perform the tests at regular intervals, according to a predetermined schedule and/or in response to receiving instructions from a technician.

At block 858, the example method 850 includes the controller determining whether a status of the permanent reference electrode is below a status threshold. In embodiments, the controller may determine the status of the permanent reference electrode based on one or more datapoints collected during the tests performed at block 856. For example, in an embodiment, the controller may compare a current voltage of the permanent reference electrode to a previous voltage of the permanent reference electrode. The controller may determine that the status of the permanent reference electrode is below the status threshold in response to the voltage changing by more than a predetermined voltage threshold, in embodiments. As another example, in certain embodiments, the controller may determine that the status of the permanent reference electrode is below the status threshold in response to determining that a moisture level determined by a moisture sensor proximate the permanent reference electrode is below a predetermined moisture threshold.

In response to determining the status of the permanent reference electrode is below the status threshold, at block 860, the example method 850 includes the controller watering the permanent reference electrode from the test station, such as by providing fluid through a conduit of an electrode watering assembly, to a cap of the electrode watering assembly, and to the permanent reference electrode. As provided herein, the electrode watering assembly improves operation of the permanent reference electrode by enabling effective maintenance of the electrolyte compound therein from the test station. In some embodiments, the controller may perform block 860 by instructing an actuator of the electrode watering assembly to water the permanent reference electrode. As discussed above, the actuator may therefore cause fluid from a fluid source to flow through the conduit, into the cap, and to the permanent reference electrode.

In response to determining that the status of the permanent reference electrode is above the status threshold, the controller may proceed to return to block 856 to continue performing tests with and maintenance on the permanent reference electrode. As such, the one or more tests of block 856 may be readily repeated after the permanent reference electrode is watered, in some embodiments. Certain embodiments may include using the electrode watering assembly to rewet or moisturize the electrolyte compound of the permanent reference electrode at regular intervals, such as weekly, monthly, yearly, and so forth. Additionally or alternatively, certain embodiments include rewetting or moisturizing the permanent reference electrode in response to detecting a predetermined threshold change in voltage or other cathodic criteria or parameters associated with the permanent reference electrode. Therefore, the electrode watering assembly is usable with the permanent reference electrode to facilitate long-term, convenient maintenance and/or monitoring of cathodic protection systems.

Figure 12:
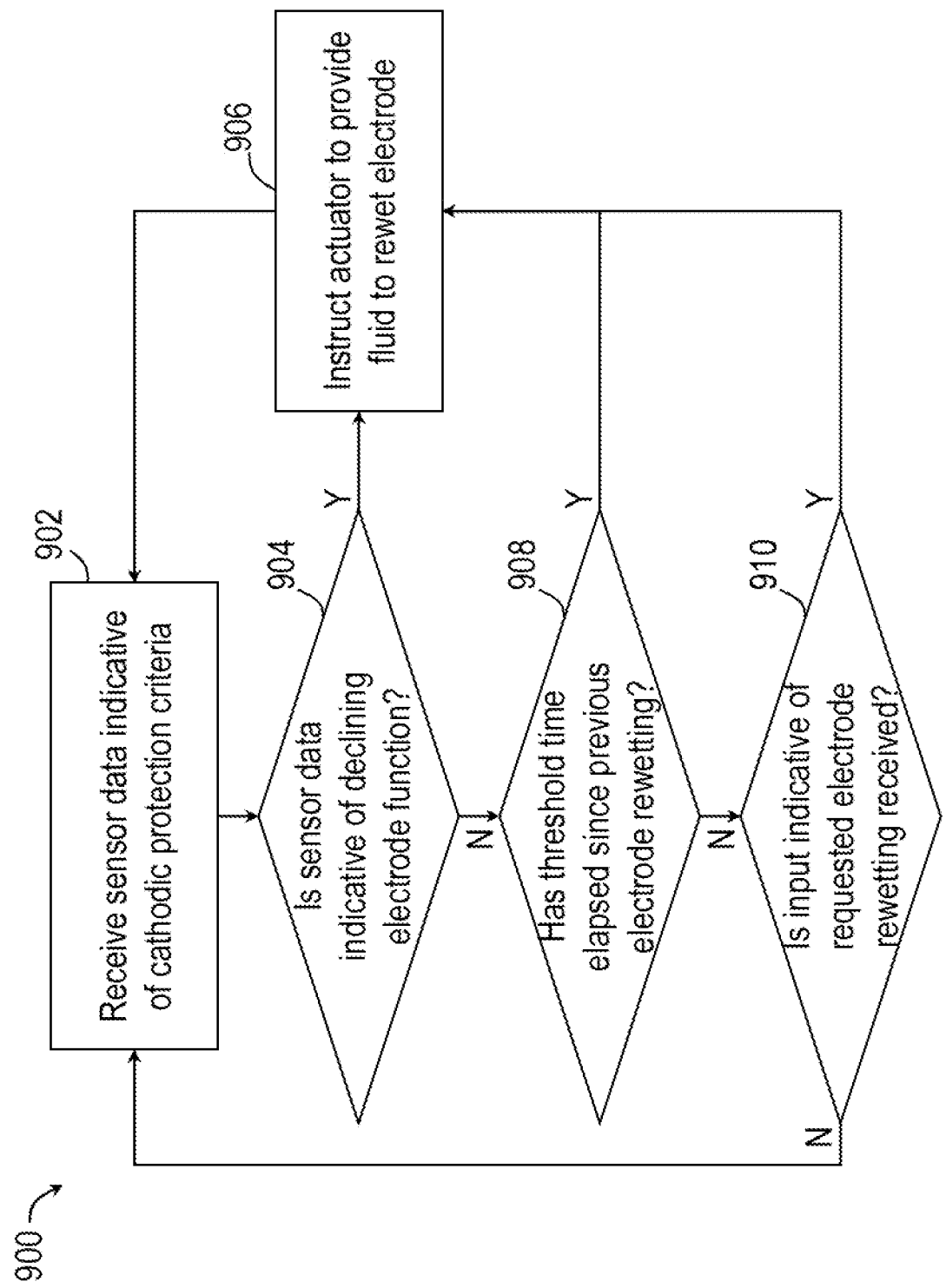
FIG. 12 is a block diagram of an example method for controlling an electrode watering system, according to embodiments of the disclosure.

As further explanation, FIG. 12 is a block diagram of an example method 900 for controlling an electrode watering system for improved maintenance and operation of a permanent reference electrode, according to embodiments of the disclosure, such as those described herein, as well as others. The example method 900 is illustrated as a collection of blocks in a logical flow graph, which represents a sequence of operations. The order in which the operations are described is not intended to be construed as a limitation, and any number of the described blocks may be combined in any order and/or in parallel to implement the method 900. Additionally, certain embodiments include a controller having a processor to perform all or a portion of the steps of example method 900, such as the controller 80 introduced in FIG. 1 and further described below.

At block 902, the example method 900 includes receiving sensor data indicative of cathodic protection criteria. In some embodiments, the sensor data is collected from monitoring of the cathodic protection of the structure, such as the structure 26 of FIG. 1. The sensor data may include signals and/or data received from one or more suitable sensors of the electrode watering system, including the permanent reference electrode itself, a cathodic protection system, an electrical system, a moisture sensor proximate the permanent reference electrode or cathodically protected structure, a pH sensor, a temperature sensor, a pressure sensor, a voltage sensor, and so forth. Indeed, the sensor data may include any suitable combination of one or more operating parameters or test data from which the controller may monitor the operation of the permanent reference electrode.

At block 904, the example method 900 includes determining whether the sensor data is indicative of declining function or operation of the permanent reference electrode. For instance, the controller of some embodiments may determine the sensor data is indicative of declining electrode function in response to the permanent reference electrode providing measurements outside an expected measurement threshold and/or including a rate of change for a measurement that is outside an expected rate of change threshold. The controller of some embodiments may determine the sensor data is indicative of declining electrode function in response to the permanent reference electrode having a current operational status that is below a threshold operational status. As another example, in certain embodiments, the controller may determine the sensor data is indicative of declining electrode function in response to the sensor data indicating that a moisture level associated with or measured near the permanent reference electrode is below a predetermined moisture level threshold.

In response to determining the sensor data is indicative of declining electrode function, at block 906, the example method 900 includes instructing one or more actuators to provide fluid to rewet the permanent reference electrode. As discussed above, the one or more actuators of the electrode watering system may therefore cause fluid from a fluid source to flow through a conduit of an electrode watering assembly, to a cap of the electrode watering assembly, and to the permanent reference electrode as an efficient maintenance operation. The rewetting may therefore reestablish or maintain normal operation of the permanent reference electrode automatically after a decline in function is detected or predicted to occur. In embodiments, the method 900 includes returning to block 902 to continue receiving sensor data associated with operation of the permanent reference electrode.

In response to determining the sensor data is not indicative of declining electrode function, at block 908, the example method 900 includes determining whether a threshold time has elapsed since a previous electrode rewetting. In embodiments, the threshold time may include any suitable period of time at which regular rewetting of the permanent reference electrode is determined to improve its operation. The threshold time may be individually programmed within the controller for the electrode watering system and/or set based on a dryness of an associated environment, in some embodiments. As non-limiting examples, the threshold time may be set as 1 day, 7 days, 14 days, 30 days, 1 month, 3 months, 6 months, and so forth, with shorter threshold times being selected for areas associated with greater environmental dryness. In some embodiments, the controller may determine and/or adjust the threshold time based on previous operation of the electrode watering system. The threshold time may be manually set or adjusted by a technician, in certain embodiments.

In response to determining the threshold time has elapsed since a previous electrode rewetting, the example method 900 includes instructing one or more actuators to provide fluid to rewet the permanent reference electrode, as provided in block 906. In certain embodiments, performing the rewetting of block 906 resets the threshold time of block 908, such that the electrode watering system is prepared or ready to perform targeted maintenance operations at future prescribed intervals.

In response to determining the threshold time has not elapsed since a previous electrode rewetting, at block 910, the example method 900 includes determining whether input indicative of requested electrode rewetting has been received. For example, in certain embodiments, the controller may receive user input indicative of requested electrode rewetting from any suitable user interface, such as a mobile device in signal communication with the controller. Additional non-examples of suitable user interfaces are discussed below with reference to FIG. 13. In certain embodiments, the controller may also receive one or more credentials from the user interface and analyze the credentials to determine whether the user is authorized for interacting with the electrode watering system, before performing the electrode rewetting. As examples, the user may provide an identification number, a password, a username, or other data that the controller may use to compare against a datastore or database of approved credentials.

In response to determining input indicative of requested electrode rewetting has been received, the example method 900 may proceed to block 906 to instruct the actuator to provide fluid to rewet the permanent reference electrode. In response to determining input indicative of requested electrode rewetting has not been received, or is received but not accompanied with corresponding credentials, the example method 900 may return to block 902 to continue receiving sensor data associated with operation of the permanent reference electrode.

In certain embodiments, the controller may also generate a log that includes data for each time the electrode watering system provides fluid to the permanent reference electrode. The controller may analyze the log to determine and implement further improvements of the electrode watering system, such as adjustments of the threshold time, an amount of fluid provided at block 906, or other parameters associated with electrode maintenance. Further, the method 900 may perform the determinations of blocks 904, 908, and 910 in any suitable order. For example, certain embodiments may include performing each of the determinations of blocks 904, 908, and 910 in parallel to provide robust and multi-faceted maintenance of the permanent reference electrode. Accordingly, the controller performing the method 900 may coordinate multiple determinations, subsystems, or modules to provide the permanent reference electrode with efficient, targeted maintenance actions that improve its useable lifetime.

Figure 13:
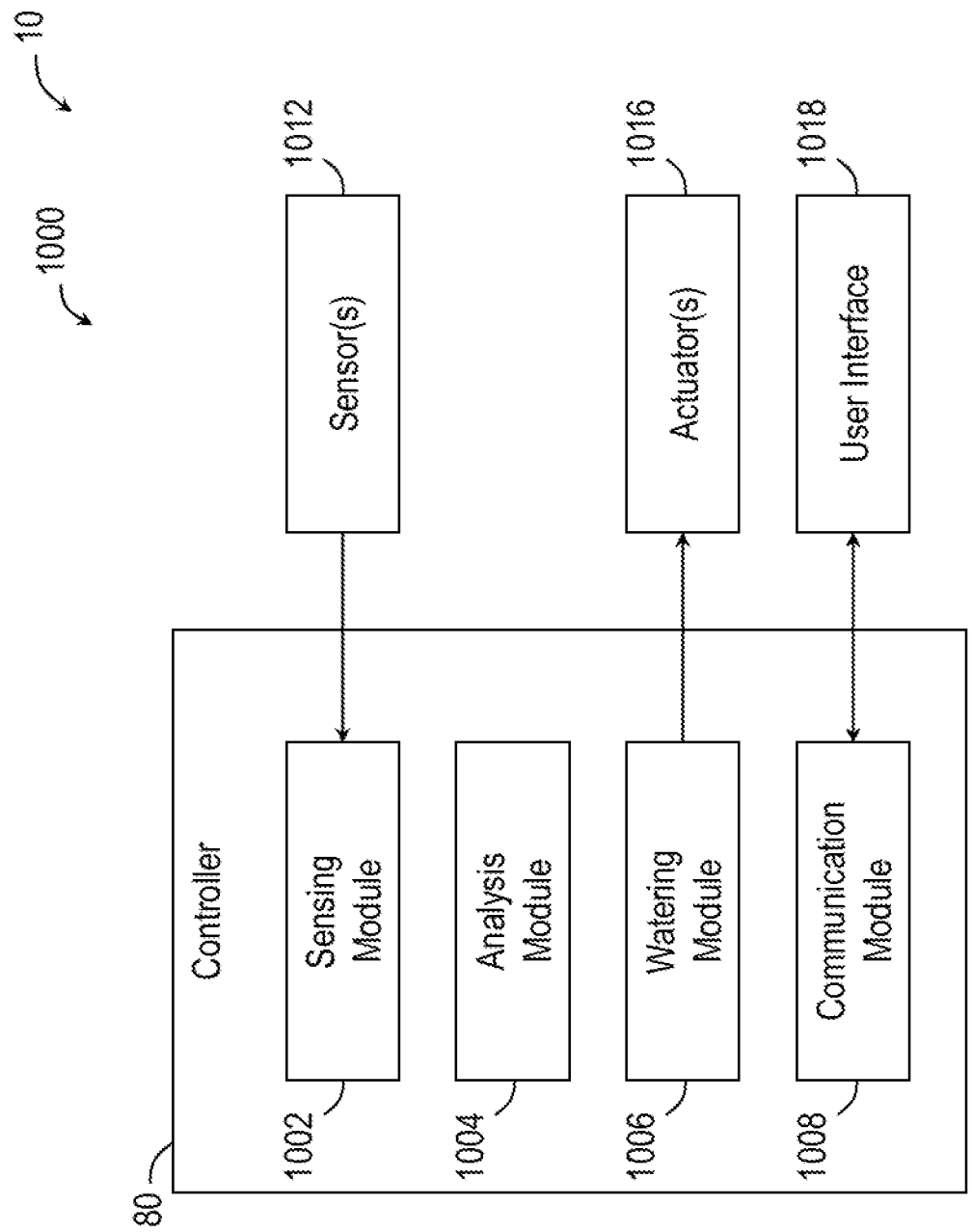
FIG. 13 is a schematic diagram of an example control system for an electrode watering system, according to embodiments of the disclosure.

FIG. 13 is a schematic diagram of an example control system 1000 for an electrode watering system 10, according to embodiments of the disclosure. As illustrated, the control system 1000 may include a controller, such as the controller 80 discussed above, which includes one or more processors and one or more memories. In certain embodiments, the controller 80 includes various modules, subsystems, or instructions for performing suitable control actions within the electrode watering system 10. For example, the illustrated embodiment of the controller 80 includes a sensing module 1002, an analysis module 1004, a watering module 1006, and a communication module 1008. It should be understood that the illustrated arrangement and components of the modules of the controller 80 is a non-limiting example, and the modules may be combined and/or rearranged within the controller 80 in any suitable manner. The modules of the controller 80 may cooperate to perform one or more of the operations described herein with reference to the electrode watering system 10, in certain embodiments.

Looking to the modules in more detail, the sensing module 1002 may be provided to communicatively couple to sensors 1012 of the electrode watering system 10 to receive sensor data therefrom. The sensors 1012 may measure or detect any suitable operating parameters, sensor data, and/or test data to facilitate monitoring operation of the electrode watering system 10, in certain embodiments. For instance, the sensors 1012 may collect sensor data including voltage or other cathodic criteria or parameters associated with a permanent reference electrode 22, chemical properties, temperature, pressure, moisture content, and/or other properties, as will be understood by a person skilled in the art. The sensing module 1002 may include any suitable input/output devices and/or communication devices that facilitates collection of the sensor data from the sensors 1012. In some embodiments, the sensing module 1002 may operate as a data hub that collects, assembles, and/or formats the data received from the sensors 1012 to improve an operating efficiency of other components of the controller 80.

In embodiments, the analysis module 1004 receives the sensor data from the sensing module 1002. The analysis module 1004 may evaluate or analyze the sensor data to determine one or more parameters of the permanent reference electrode 22, such as an operating status, a moisture level, a voltage, and/or any other cathodic protection criteria. In certain embodiments, the analysis module 1004 may include any suitable programming, software, and/or circuitry that facilitates determination of any suitable control and/or maintenance actions for the permanent reference electrode. The analysis module 1004 may therefore generate instructions to coordinate operation of the electrode watering system, based on specific analysis of data provided by the sensing module 1002.

In embodiments, the analysis module 1004 may provide instructions to the watering module 1006, such as in response to determining that a maintenance action is to be performed on the permanent reference electrode 22. In the illustrated embodiment, the watering module 1006 is in signal communication with one or more actuators 1016 of the control system 1000. As previously described, the actuators 1016 may include any suitable devices for causing fluid from a fluid source to rewet the permanent reference electrode 22. For example, an actuator 1016 may be operatively coupled to a fluid source of the test station 40, and may receive instructions from the watering module 1006 to provide fluid into a conduit 52 coupled to a cap 50, 300 that is disposed over the permanent reference electrode 22. In response to the instructions, the actuator 1016 may open a valve or otherwise fluidly connect the fluid source to the conduit 52 to provide the fluid to the conduit 52, the cap 50, 300, and the permanent reference electrode 22. In embodiments, any suitable actuators 1016 may be provided in the control system 1000 to initiate changes for improved operation and maintenance of the permanent reference electrode 22.

In certain embodiments, the controller 80 also includes a communication module 1008 that may be in signal communication with, or communicatively coupled to, one or more user interfaces 1018 of the control system 1000. For example, certain embodiments of the user interface 1018 may include a user device, such as a mobile phone, a smartphone, a tablet, a laptop, a desktop computer at a remote service station, and so forth. Additionally or alternatively, the user interface 1018 may include a control panel, keypad, or other device installed with a test station. In certain embodiments, the user interface 1018 also facilitates collection of user credentials that the controller 80 verifies to authorize and/or permit the user to control operation of the electrode watering system. The controller 80 may therefore receive direct instructions from the user interface to initiate a maintenance action. Accordingly, certain embodiments of the electrode watering system 10 disclosed herein provide robust, multi-faceted monitoring and maintenance for the permanent reference electrodes 22, such as by directing fluid to rewet the permanent reference electrodes 22 via the electrode watering assembly 20 in response to specific determinations made by the controller 80.

Having now described some illustrative embodiments of the disclosure, it should be apparent to those skilled in the art that the foregoing is merely illustrative and not limiting, having been presented by way of example only. Numerous modifications and other embodiments are within the scope of one of ordinary skill in the art and are contemplated as falling within the scope of the disclosure. In particular, although many of the examples presented herein involve specific combinations of method acts or system elements, it should be understood that those acts and those elements may be combined in other ways or configurations to accomplish the same objectives. Those skilled in the art should appreciate that the parameters and configurations described herein are exemplary and that actual parameters and/or configurations will depend on the specific application in which the systems, methods, and/or aspects or techniques of the disclosure are used. Those skilled in the art should also recognize or be able to ascertain, using no more than routine experimentation, equivalents to the specific embodiments of the disclosure. It is, therefore, to be understood that the embodiments described herein are presented by way of example only and that, within the scope of any appended claims and equivalents thereto, the disclosure may be practiced other than as specifically described.

The present application claims priority to and the benefit of U.S. Provisional Application No. 63/466,056, filed May 12, 2023, titled "TEST STATION ASSEMBLIES FOR MONITORING CATHODIC PROTECTION OF STRUCTURES AND RELATED METHODS," U.S. Provisional Application No. 63/466,062, filed May 12, 2023, titled "TEST STATION ASSEMBLIES FOR MONITORING CATHODIC PROTECTION OF STRUCTURES AND RELATED METHODS," and U.S. Provisional Application No. 63/513,391, filed Jul. 13, 2023, titled "ELECTRODE WATERING ASSEMBLIES AND METHODS FOR MAINTAINING CATHODIC MONITORING OF STRUCTURES," the disclosures of each of which are incorporated herein by reference in their entireties. The present application is also a continuation-in-part of U.S. Non-Provisional application Ser. No. 17/886,178, filed Aug. 11, 2022, titled "ASSEMBLIES AND METHODS FOR MONITORING CATHODIC PROTECTION OF STRUCTURES," which is a divisional of U.S. Non-Provisional application Ser. No. 17/805,801, filed Jun. 7, 2022, titled "ASSEMBLIES AND METHODS FOR MONITORING CATHODIC PROTECTION OF STRUCTURES," now U.S. Pat. No. 11,447,877, issued Sep. 20, 2022, which claims priority to and the benefit of U.S. Provisional Application No. 63/365,102, filed May 20, 2022, titled "ASSEMBLIES AND METHODS FOR MONITORING CATHODIC PROTECTION OF STRUCTURES," and U.S. Provisional Application No. 63/260,622, filed Aug. 26, 2021, titled "MINIATURE IR ERROR FREE CATHODIC PROTECTION COUPON ASSEMBLY INSTALLED VIA PROBE," the disclosures of each of which are incorporated herein by reference in their entireties.

Furthermore, the scope of the present disclosure shall be construed to cover various modifications, combinations, additions, alterations, etc., above and to the above-described embodiments, which shall be considered to be within the scope of this disclosure. Accordingly, various features and characteristics as discussed herein may be selectively interchanged and applied to other illustrated and non-illustrated embodiment, and numerous variations, modifications, and additions further may be made thereto without departing from the spirit and scope of the present disclosure as set forth in the appended claims.

What is claimed is:

1. An electrode watering system to maintain cathodic monitoring of a structure at least partially underground, the electrode watering assembly comprising:
   a permanent reference electrode configured to monitor cathodic protection of the structure, the permanent reference electrode having a proximal electrode end, a distal electrode end, and an electrode therebetween;
   a cap comprising a cap body defining a reservoir adjacent to the proximal electrode end, the cap body having a distal cap end defining a distal opening disposed around the proximal electrode end and a proximal cap end defining a proximal opening;
   an electrical conductor electrically coupled to the electrode, the electrical conductor extending from the proximal electrode end and through the distal opening, the reservoir, and the proximal opening; and
   a conduit having a distal conduit end fluidly coupled to the proximal opening and a proximal conduit end configured to be positioned at a cathodic test station, such that fluid directed into the proximal conduit end is directed through the conduit and into the reservoir for watering the proximal electrode end.

2. The electrode watering system of claim 1, wherein the permanent reference electrode comprises a solid electrolyte compound or a gel electrolyte compound between the proximal electrode end and the distal electrode end.

3. The electrode watering system of claim 1, further comprising a gasket positioned between the proximal electrode end and the distal cap end to establish a waterproof seal therebetween.

4. The electrode watering system of claim 1, wherein the proximal opening of the proximal cap end has a smaller open area than the distal opening of the distal cap end.

5. The electrode watering system of claim 1, further comprising a waterproof connector disposed around the proximal cap end to establish a waterproof seal between the electrical conductor, the conduit, and the proximal cap end.

6. The electrode watering system of claim 5, wherein the waterproof connector comprises heat shrink tape, a gasket, or a combination thereof.

7. The electrode watering system of claim 1, wherein the cap body comprises a distal tubular section having a first diameter, a proximal tubular section having a second diameter, and a shoulder section that slopes between the first diameter and the second diameter.

8. The electrode watering system of claim 1, wherein the cap body comprises a divider wall defining an annular channel at least partially overlapped with the reservoir along a longitudinal axis, and wherein the annular channel is configured to receive overflow fluid from the reservoir and direct the overflow fluid to a surrounding environment.

9. An electrode watering system to maintain cathodic monitoring of a structure at least partially underground, the electrode watering assembly comprising:
 a permanent reference electrode configured to monitor cathodic protection of the structure, the permanent reference electrode having a proximal electrode end, a distal electrode end, and an electrode and an electrolyte compound between the proximal electrode end and the distal electrode end;
 a cap comprising a cap body defining a reservoir adjacent to the proximal electrode end, the cap body having a distal cap end defining a distal opening disposed around the proximal electrode end and a proximal cap end defining a proximal opening, and the proximal opening having a smaller open area than the distal opening;
 an electrical conductor electrically coupled to the electrode, the electrical conductor extending from the proximal electrode end and through the distal opening, the reservoir, and the proximal opening; and
 a conduit having a distal conduit end fluidly coupled to the proximal opening and a proximal conduit end configured to be positioned at a cathodic test station, such that fluid directed into the proximal conduit end is directed through the conduit and into the reservoir for watering the proximal electrode end.

10. The electrode watering system of claim 9, wherein the electrolyte compound comprises a solid electrolyte compound or a gel electrolyte compound.

11. The electrode watering system of claim 9, further comprising a gasket positioned between the proximal electrode end and the distal cap end to establish a waterproof seal therebetween.

12. The electrode watering system of claim 9, further comprising a waterproof connector disposed around the proximal cap end to establish a waterproof seal between the electrical conductor, the conduit, and the proximal cap end.

13. The electrode watering system of claim 12, wherein the waterproof connector comprises heat shrink tape, a gasket, or a combination thereof.

14. The electrode watering system of claim 9, wherein the cap body comprises a distal tubular section having a first diameter, a proximal tubular section having a second diameter, and a shoulder section that slopes between the first diameter and the second diameter.

15. The electrode watering system of claim 9, wherein the cap body comprises a divider wall defining an annular channel at least partially overlapped with the reservoir along a longitudinal axis, and wherein the annular channel is configured to receive overflow fluid from the reservoir and direct the overflow fluid to a surrounding environment.

16. An electrode watering system to maintain cathodic monitoring of a structure at least partially underground, the electrode watering assembly comprising:
 a permanent reference electrode configured to monitor cathodic protection of the structure, the permanent reference electrode having a proximal electrode end, a distal electrode end, and an electrode therebetween;
 a cap comprising a cap body defining a reservoir adjacent to the proximal electrode end, the cap body having a distal cap end defining a distal opening disposed around the proximal electrode end and a proximal cap end defining a proximal opening, and the distal cap end being fluidly sealed against the proximal electrode end;
 an electrical conductor electrically coupled to the electrode, the electrical conductor extending from the proximal electrode end and through the distal opening, the reservoir, and the proximal opening; and
 a conduit having a distal conduit end fluidly coupled to the proximal opening and a proximal conduit end configured to be positioned at a cathodic test station, such that fluid directed into the proximal conduit end is directed through the conduit and into the reservoir for watering the proximal electrode end, and the proximal cap end being fluidly sealed against the electrical conductor and the distal conduit end.

17. The electrode watering system of claim 16, wherein the permanent reference electrode comprises a solid electrolyte compound or a gel electrolyte compound between the proximal electrode end and the distal electrode end.

18. The electrode watering system of claim 16, further comprising a gasket positioned between the proximal electrode end and the distal cap end to establish a waterproof seal therebetween.

19. The electrode watering system of claim 16, wherein the proximal opening of the proximal cap end has a smaller open area than the distal opening of the distal cap end.

20. The electrode watering system of claim 16, further comprising a waterproof connector disposed around the proximal cap end to establish a waterproof seal between the electrical conductor, the conduit, and the proximal cap end.

21. The electrode watering system of claim 20, wherein the waterproof connector comprises heat shrink tape, a gasket, or a combination thereof.

22. The electrode watering system of claim 16, wherein the cap body comprises a distal tubular section having a first diameter, a proximal tubular section having a second diameter, and a shoulder section that slopes between the first diameter and the second diameter.

23. The electrode watering system of claim 16, wherein the cap body comprises a divider wall defining an annular channel at least partially overlapped with the reservoir along a longitudinal axis, and wherein the annular channel is configured to receive overflow fluid from the reservoir and direct the overflow fluid to a surrounding environment.

\* \* \* \* \*